(12) United States Patent
Sinha

(10) Patent No.: US 11,676,023 B2
(45) Date of Patent: Jun. 13, 2023

(54) SYSTEMS AND METHODS FOR PERFORMING DIRECT CONVERSION OF IMAGE SENSOR DATA TO IMAGE ANALYTICS

(71) Applicant: Pavel Sinha, Brossard (CA)

(72) Inventor: Pavel Sinha, Brossard (CA)

( * ) Notice: Subject to any disclaimer, the term of this patent is extended or adjusted under 35 U.S.C. 154(b) by 244 days.

(21) Appl. No.: 17/105,293

(22) Filed: Nov. 25, 2020

(65) Prior Publication Data
US 2021/0158096 A1 May 27, 2021

Related U.S. Application Data

(60) Provisional application No. 63/025,580, filed on May 15, 2020, provisional application No. 62/941,646, filed on Nov. 27, 2019.

(51) Int. Cl.
| | | |
|---|---|---|
| *G06F 18/214* | (2023.01) | |
| *G06N 3/08* | (2023.01) | |
| *G06N 3/04* | (2023.01) | |
| *G06V 10/147* | (2022.01) | |
| *G06V 10/98* | (2022.01) | |
| *G06F 18/24* | (2023.01) | |

(Continued)

(52) U.S. Cl.
CPC ...... *G06F 18/2148* (2023.01); *G06F 18/2155* (2023.01); *G06F 18/24* (2023.01); *G06N 3/04* (2013.01); *G06N 3/08* (2013.01); *G06V 10/147* (2022.01); *G06V 10/98* (2022.01); *H04N 23/84* (2023.01); *H04N 25/13* (2023.01)

(58) Field of Classification Search
CPC .. G06F 18/2148; G06F 18/24; G06F 18/2155; G06V 10/147; H04N 23/84; G06N 3/04; G06N 3/08
See application file for complete search history.

(56) References Cited

U.S. PATENT DOCUMENTS 11,158,055 B2 * 10/2021 Lin .................. G06N 3/082
2020/0051217 A1   2/2020 Shen et al.
(Continued)

FOREIGN PATENT DOCUMENTS

WO       2018200075 A1   11/2018

OTHER PUBLICATIONS

Zhao, Yuzhi, et al. "Saliency map-aided generative adversarial network for raw to rgb mapping." 2019 IEEE/CVF International Conference on Computer Vision Workshop (ICCVW). IEEE, 2019. (Year: 2019).*

(Continued)

*Primary Examiner* — Utpal D Shah
(74) *Attorney, Agent, or Firm* — Loza & Loza, LLP; Gabriel Fitch

(57) ABSTRACT

Systems and methods for performing direct conversion of image sensor data to image analytics are provided. One such system for directly processing sensor image data includes a sensor configured to capture an image and generate corresponding image data in a raw Bayer format, and a convolution neural network (CNN) coupled to the sensor and configured to generate image analytics directly from the image data in the raw Bayer format. Systems and methods for training the CNN are provided, and may include a generative model that is configured to convert RGB images into estimated images in the raw Bayer format.

18 Claims, 19 Drawing Sheets

(51) Int. Cl.
*H04N 23/84* (2023.01)
*H04N 25/13* (2023.01)

(56) References Cited

U.S. PATENT DOCUMENTS

| | | | | |
|---|---|---|---|---|
| 2020/0111198 A1* | 4/2020 | Hiasa | .................. | G06T 5/20 |
| 2021/0149005 A1* | 5/2021 | Wang | ................ | G01R 33/5608 |
| 2022/0318956 A1* | 10/2022 | Xu | .................. | G06V 10/774 |
| 2022/0414849 A1* | 12/2022 | Wang | .................. | G06T 5/10 |

OTHER PUBLICATIONS

PCT/IB2020/001007. International Search Report & Written Opinion (dated Mar. 25, 2021) pp. 8.

Krizhevsky et al., "ImageNet Classification with Deep Convolutional Neural Networks", Communications of the ACM, Association for Computing Machinery, Inc., vol. 60, No. 6, 2012, pp. 84-90. <https:llpapers.nips.cc/paper/2012/file/c3 99862d3b9d6b 76c8436e924a68c45b-Paper pdf> pp. 9.

Jiang, Haomiao et al., "Learning the Image Processing Pipeline", Cornell University; Computer Science: Computer Vision and Pattern Recognition; May 30, 2016; https://arxiv.org/pdf/1605.09336.pdf; 10 pages.

Barron, Jonathan T., "Convolutional Color Constancy", 2015 IEEE International Conference on Computer Vision; Dec. 7-13, 2015; https://ieeexplore.ieee.org/document/7410408; 17 pages.

Bianco, Simone et al., "Color Constancy Using CNNs", 2015 IEEE Conference on Computer Vision and Pattern Recognition Workshops; Jun. 7-12, 2015; https://ieeexplore.ieee.org/document/7301275; 9 pages.

Lou, Zhongyu et al., "Color Constancy by Deep Learning", British Machine Vision Conference; Sep. 2015; https://ivi.fnwi.uva.nl/isis/publications/2015/LouBMVC2015/LouBMVC2015.pdf; 12 pages.

Qian, Yanlin et al., "Recurrent Color Constancy", 2017 IEEE International Conference on Computer Vision; Oct. 22, 29, 2017; https://ieeexplore.ieee.org/document/8237844; 9 pages.

Ratnasingam, Sivalogeswaran, "Deep Camera: A Fully Convolutional Neural Network for Image Signal Processing", Cornell University; Electrical Engineering and Systems Science: Image and Video Processing; Aug. 24, 2019; https://arxiv.org/abs/1908.09191; 11 pages.

* cited by examiner

RGGB → Flip → GRRB → RGGB

GBRG → Flip → BGGR → RGGB

BGGR → Flip → GBRG → RGGB

GRRB → Flip → RGGB

FIG. 15

Table - Example CNN Parameters

| Bayer Input | | 512 | 512 | 1 | | | | | | | |
|---|---|---|---|---|---|---|---|---|---|---|---|
| Layer No. | Function | Input Dimension | | | Filter Dimension | | | | Output Dimension | | |
| 0 | Convolution | 256 | 256 | 4 | 3 | 3 | 4 | 16 | 256 | 256 | 16 |
| 1 | Convolution | 256 | 256 | 16 | 3 | 3 | 16 | 32 | 256 | 256 | 32 |
| 2 | Max pool | | | | | | | | | | |
| 3 | Convolution | 128 | 128 | 32 | 3 | 3 | 32 | 64 | 128 | 128 | 64 |
| 4 | Max pool | | | | | | | | | | |
| 5 | Convolution | 64 | 64 | 64 | 3 | 3 | 64 | 128 | 64 | 64 | 128 |
| 6 | Convolution | 64 | 64 | 128 | 1 | 3 | 128 | 64 | 64 | 64 | 64 |
| 7 | Convolution | 64 | 64 | 64 | 3 | 3 | 64 | 128 | 64 | 64 | 128 |
| 8 | Max pool | | | | | | | | | | |
| 9 | Convolution | 32 | 32 | 128 | 3 | 3 | 128 | 256 | 32 | 32 | 256 |
| 10 | Convolution | 32 | 32 | 256 | 1 | 1 | 256 | 128 | 32 | 33 | 128 |
| 11 | Convolution | 32 | 33 | 128 | 3 | 3 | 128 | 256 | 32 | 32 | 256 |
| 12 | Max pool | | | | | | | | | | |
| 13 | Convolution | 16 | 16 | 256 | 3 | 3 | 256 | 512 | 16 | 16 | 512 |
| 14 | Convolution | 16 | 16 | 512 | 1 | 1 | 512 | 256 | 16 | 16 | 256 |
| 15 | Convolution | 16 | 16 | 256 | 3 | 3 | 256 | 512 | 16 | 16 | 512 |
| 16 | Convolution | 16 | 16 | 512 | 1 | 1 | 512 | 256 | 16 | 16 | 256 |
| 17 | Convolution | 16 | 16 | 256 | 3 | 3 | 256 | 512 | 16 | 16 | 512 |
| 18 | Max pool | | | | | | | | | | |
| 19 | Convolution | 8 | 8 | 512 | 3 | 3 | 512 | 1024 | 8 | 8 | 1024 |
| 20 | Convolution | 8 | 8 | 1024 | 1 | 1 | 1024 | 512 | 8 | 8 | 512 |
| 21 | Convolution | 8 | 8 | 512 | 3 | 3 | 512 | 1024 | 8 | 8 | 1024 |
| 22 | Convolution | 8 | 8 | 1024 | 1 | 1 | 1024 | 512 | 8 | 8 | 512 |
| 23 | Convolution | 8 | 8 | 512 | 3 | 3 | 512 | 1024 | 8 | 8 | 1024 |
| 24 | Convolution | 8 | 8 | 1024 | 1 | 1 | 1 | 1000 | 8 | 8 | 1000 |
| 25 | Avg Pool | 1 | 1 | 1000 | 1 | 1 | 1 | 1000 | 1 | 1 | 1000 |
| 26 | Softmax | 1 | 1 | 1000 | 1 | 1 | 1 | 1 | 1 | 1 | 1000 |

*FIG. 18*

SYSTEMS AND METHODS FOR PERFORMING DIRECT CONVERSION OF IMAGE SENSOR DATA TO IMAGE ANALYTICS

CROSS-REFERENCE TO RELATED APPLICATION(S)

This application claims priority to and the benefit of U.S. Provisional application No. 63/025,580 filed on May 15, 2020, and entitled, "Direct Conversion of Raw Image Sensor Input (Bayer-Pattern) to Image/Video Analytics using a Single CNN," U.S. Provisional Application No. 62/941,646 filed on Nov. 27, 2019, and entitled, "Direct Conversion of Raw Image Sensor Input (Bayer-Pattern) to Image/Video Analytics using a Single CNN," the entire content of each of which is incorporated herein by reference.

FIELD

The subject matter described herein generally relates to using machine learning and convolutional neural networks (CNNs) to generate analytics. More particularly, the subject matter described herein relates to systems and methods for performing direct conversion of image sensor data to image analytics, including using a single CNN.

INTRODUCTION

Deep learning, which may also be referred to as deep structured learning or hierarchical learning is part of a broader family of machine learning methods based on artificial neural networks. Learning can be supervised, semi-supervised or unsupervised. Deep learning architectures such as deep neural networks, deep belief networks, recurrent neural networks and convolutional neural networks (CNNs) have been applied to a number of fields, including image classification and natural language processing, where they have produced results comparable to human experts. For example, deep learning has resulted in state-of-the-art performance in image recognition and vision tasks such as object recognition, semantic segmentation, image captioning, human pose estimation and more. Most of these achievements can be attributed to the use of CNNs capable of learning complex hierarchical feature representation.

With increasing use of machine learning in edge computing applications, greater focus may be placed on matters of efficiency, including, for example, power consumption, computational efficiency, and latency. Thus, there is a need to increase the efficiency of machine learning components for edge computing applications, including image processing.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a system for directly processing sensor image data, the system comprising: a sensor configured to capture an image and generate corresponding image data in a raw Bayer format; and a convolution neural network (CNN) coupled to the sensor and configured to generate image analytics directly from the image data in the raw Bayer format.

In one aspect, the CNN is configured to perform at least one of image classification or object detection.

In one aspect, the CNN was trained using a generative model configured to convert an RGB image into an estimated image in the raw Bayer format using a ground truth image in the raw Bayer format; and the generative model was trained using image data in the raw Bayer format and without using labels.

In one aspect, the generative model is configured to generate a labeled image dataset in the raw Bayer format.

In one aspect, the CNN was trained using the labeled image dataset in the raw Bayer format.

In yet another aspect, the disclosure provides a method for directly processing sensor image data, the method comprising: receiving image data in a raw Bayer format; and generating image analytics directly from the image data in the raw Bayer format.

In another aspect, the disclosure provides a system for training a generative model that is configured to train a convolution neural network (CNN) to directly process sensor image data, the system comprising: an image signal processing (ISP) circuitry configure to receive an unlabeled ground truth image in a raw Bayer format and generate an image in a RGB format; a generative model configured to receive the image in the RGB format and generate an estimated raw image in the raw Bayer format; and an error generation circuitry configured to receive the unlabeled ground truth image in the raw Bayer format and the estimated raw image and to generate an error between the unlabeled ground truth image and the estimated raw image; wherein the generative model is configured to train based on a back propagation of the error.

In one aspect, the generative model comprises at least one of an autoencoder, a variational autoencoder, or a generative adversarial network (GAN).

In one aspect, the error generation circuitry is configured to perform at least one of a loss function, a cross-entropy loss function, or a mean squared loss function.

In one aspect, the generative model is configured to train using machine learning.

In one aspect, the generative model is configured to train based on the back propagation of the error by updating one or more weights of the generative model.

In one aspect, the generative model comprises a convolutional neural network (CNN) having a U-Net architecture.

In one aspect, the generative model comprises a convolutional neural network (CNN) having a modified U-Net architecture comprising an encoder layer and a decoder layer; and the generative model is configured to generate a scaled input image and pass it to each of the encoder layer and the decoder layer.

In yet another aspect, the disclosure provides a method for training a generative model that is configured to train a convolution neural network (CNN) to directly process sensor image data, the method comprising: receiving an unlabeled ground truth image in a raw Bayer format; generating an image in a RGB format corresponding to the unlabeled ground truth image; receiving, at a generative model, the image in the RGB format; generating, at the generative model, an estimated raw image in the raw Bayer format corresponding to the image in the RGB format; generating an error between the unlabeled ground truth image and the estimated raw image; and training, at the generative model, based on a back propagation of the error.

In one aspect, the training comprises updating one or more weights of the generative model.

In yet another aspect, this disclosure provides a system for training a convolution neural network (CNN) to directly process sensor image data, the system comprising: an error generation circuitry; a trained generative model configured to receive an image in an RGB format and generate a corresponding image in a raw Bayer format; and a CNN configured to receive the image in the raw Bayer format and generate an estimated label; wherein the error generation circuitry is configured to: receive a known label corresponding a pattern contained in the image in the RGB format; receive the estimated label from the CNN; and generate an error between the estimated label and the known label; and wherein the CNN is configured to train based on a back propagation of the error.

In one aspect, the image in the RGB format is provided with the known label.

In one aspect, the image in the raw Bayer format is unlabeled.

In one aspect, the error generation circuitry is configured to perform at least one of a loss function, a cross-entropy loss function, or a mean squared loss function.

In one aspect, the generative model was trained using machine learning.

In one aspect, the CNN is configured to train based on the back propagation of the error by updating one or more weights of the CNN.

In yet another aspect, this disclosure provides a method for training a convolution neural network (CNN) to directly process sensor image data, the method comprising: receiving an image in an RGB format and with a known label; generating an image in a raw Bayer format corresponding to the image in the RGB format; generating, at the CNN, an estimated label based on the image in the raw Bayer format; generating an error between the estimated label and the known label; and training, at the CNN, based on a back propagation of the error.

In one aspect, the training comprises updating one or more weights of the CNN.

In yet another aspect, this disclosure provides a method for directly processing sensor image data, the method comprising: training a generative model to convert an RGB image into an estimated image in a raw Bayer format using a ground truth image in the raw Bayer format; generating, using the trained generative model, a labeled dataset in the raw Bayer format from a labeled RGB image dataset; training a convolution neural network (CNN) using the labeled Bayer dataset such that the CNN is configured to directly process sensor images in the raw Bayer format; and generating, using the trained CNN, image analytics directly from image data in the raw Bayer format captured by a sensor.

In yet another aspect, this disclosure provides an apparatus for directly processing sensor image data, the apparatus comprising: a means for receiving image data in a raw Bayer format; and a means for generating image analytics directly from the image data in the raw Bayer format.

In yet another aspect, this disclosure provides a system for directly processing sensor image data, the system comprising: a sensor configured to capture an image and generate corresponding image data in a raw RGB format; and a convolution neural network (CNN) coupled to the sensor and configured to generate image analytics directly from the image data in the raw RGB format.

BRIEF DESCRIPTION OF THE DRAWINGS

FIG. 15 illustrates a method to choose the selection of pixels to maintain a single CFA pattern (e.g., RGGB) throughout a training process, in accordance with some aspects of the disclosure.

FIG. 18 is a table listing parameters that can be used for a CNN configured to perform direct image conversion, in accordance with some aspects of the disclosure.

DETAILED DESCRIPTION

Figure 1:
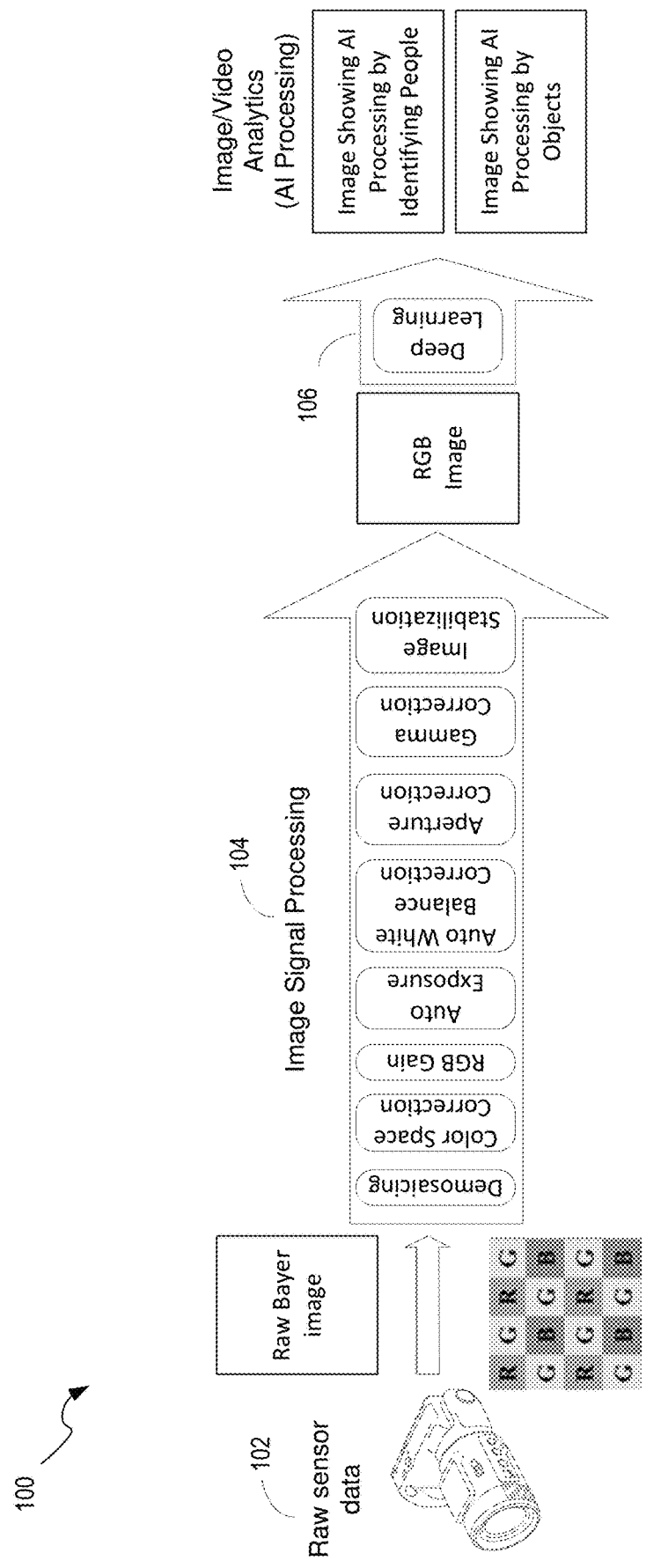
FIG. 1 shows a block diagram of an indirect image processing system including an image signal processing (ISP) pipeline and a deep learning component that generates image analytics using RGB input images produced via the ISP pipeline.

Referring now to the drawings, systems and methods for directly processing sensor image data are presented. One such system includes a sensor configured to capture an image and generate corresponding image data in a raw Bayer format, and a convolution neural network (CNN) coupled to the sensor and configured to generate image analytics directly from the image data in the raw Bayer format. As compared to other approaches, such as the approach illustrated in FIG. 1 that first converts raw sensor image data to image data in a red green blue (RGB) format and then performs processing on the RGB image data, the disclosed systems are more efficient. In one aspect, and in order to train a CNN that can generate image analytics directly from the image data in the raw Bayer format, a generative model may be used that is configured to convert an RGB image into an estimated image in the raw Bayer format using a ground truth image in the raw Bayer format. The generative model may be trained, and then used to train the CNN to identify patterns, or other analytic information, contained in image data in the raw Bayer format, where the raw Bayer image format is most commonly used by today's cameras. Systems and methods for training the generative model and CNN may be used to configure the CNN to directly process sensor image data in the raw Bayer format.

FIG. 1 shows a block diagram of an indirect image processing system (ISP) 100 including an image signal processing (ISP) pipeline 104 and a deep learning component 106 that generates image analytics 108 using RGB input images produced via the ISP pipeline. The ISP receives raw sensor data (e.g., image data in raw Bayer format) from a sensor (e.g., camera) 102. When a picture is taken, a digital camera (e.g., camera 102) initially produces a raw Bayer pixel array from the image sensor, where only one color per pixel is represented (see FIG. 2*a* for a sample pixel representation). The raw Bayer image (see example in FIG. 2*b*) 102 may then be used to reconstruct the actual image (e.g., RGB image of FIG. 2*c*) through a sequence of image signal processing steps (e.g., performed by ISP 104).

Figure 2B:
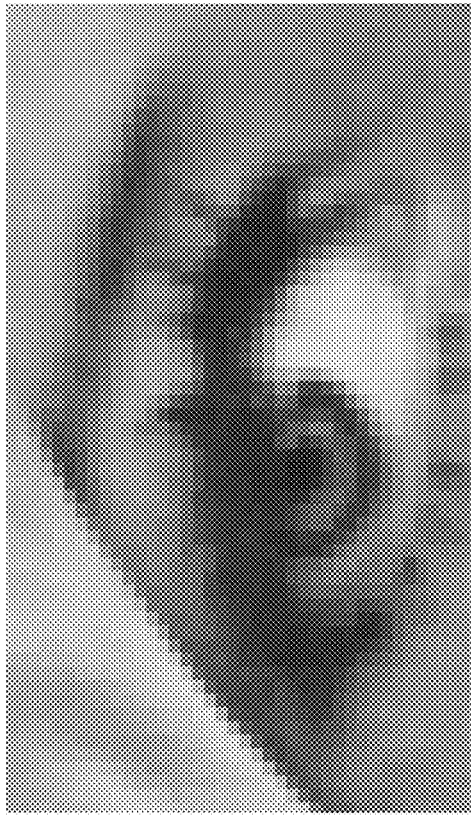
FIGS. 2a, 2b, and 2c show a sample pixel representation of a Bayer pattern, a raw Bayer image, and a resulting RGB image, respectively.
Figure 2C:
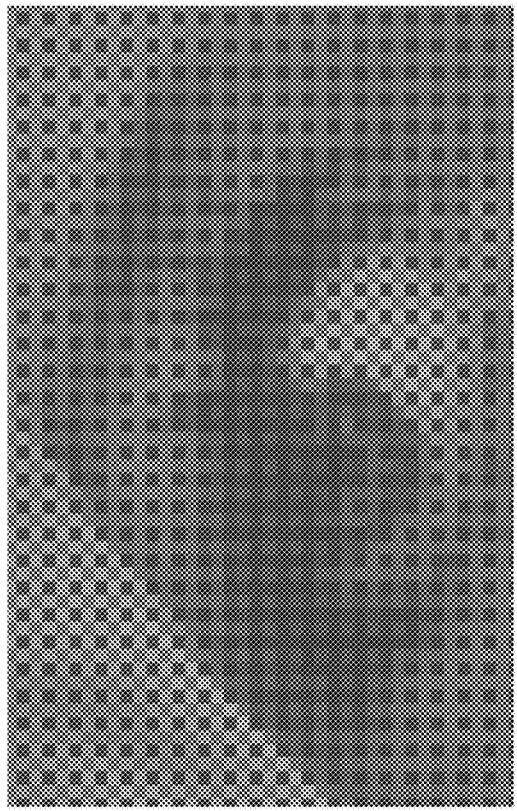
Figure 2A:
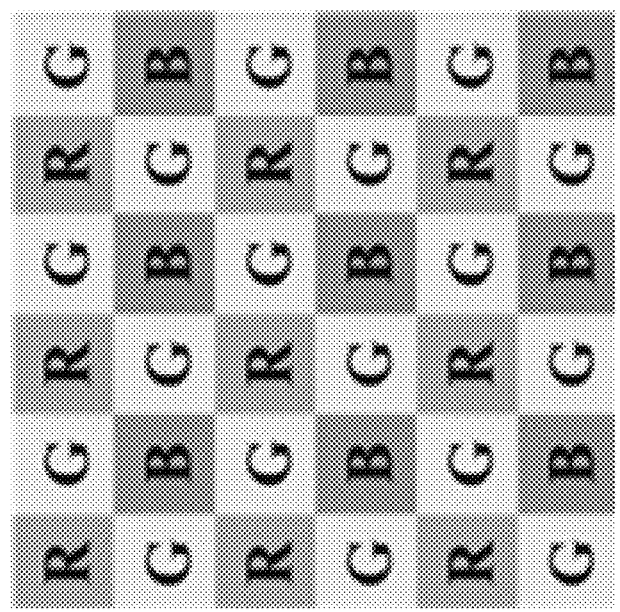

FIGS. 2*a*, 2*b*, and 2*c* show a sample pixel representation of a Bayer pattern, a raw Bayer image, and a resulting RGB image, respectively.

Returning now to FIG. 1, the traditional ISP pipeline (e.g., as shown for ISP 104) usually includes the following steps in sequence: demosaicing, color correction, RGB gain, auto exposure, auto white balance correction, aperture correction, gamma correction, two dimensional (2D) image denoising, image stabilization, and fish-eye de-warping, to reconstruct the final visible image. The image inputs of most CNNs (e.g., deep learning component 106) are the reconstructed images (e.g., RGB images) from the ISP 104. However, the goal in many applications is for CNNs to extract image/video analytics and not to construct or re-construct a visible image. For example, when using object detection models in autonomous driving, the bounding boxes and object categories help determine the next action, and the ISP step is used only because the CNN models are almost always trained with RGB images.

Further, use of the ISP 104 may introduce several image artifacts from ringing effect, color moire, aliasing, and the like. These 2D effects may get exaggerated in a video stream. The artifacts inherently cause difficulty in the training process of CNNs and result in reduced accuracy. The ISP pipeline 104 of FIG. 1 illustrates a number of ISP functional blocks. The number of functional blocks used by the ISP 104, and corresponding processing, to generate a visually acceptable image adds to the total delay in obtaining the processed output (e.g., latency). The resultant RGB image is then processed by CNN 106 to generate the desired image/video analytics.

This disclosure proposes, among other things, that the CNN performs inference directly from the raw Bayer images, bypassing the need for the ISP steps, and thereby saving computation cost, improving latency, and the like.

Figure 3:
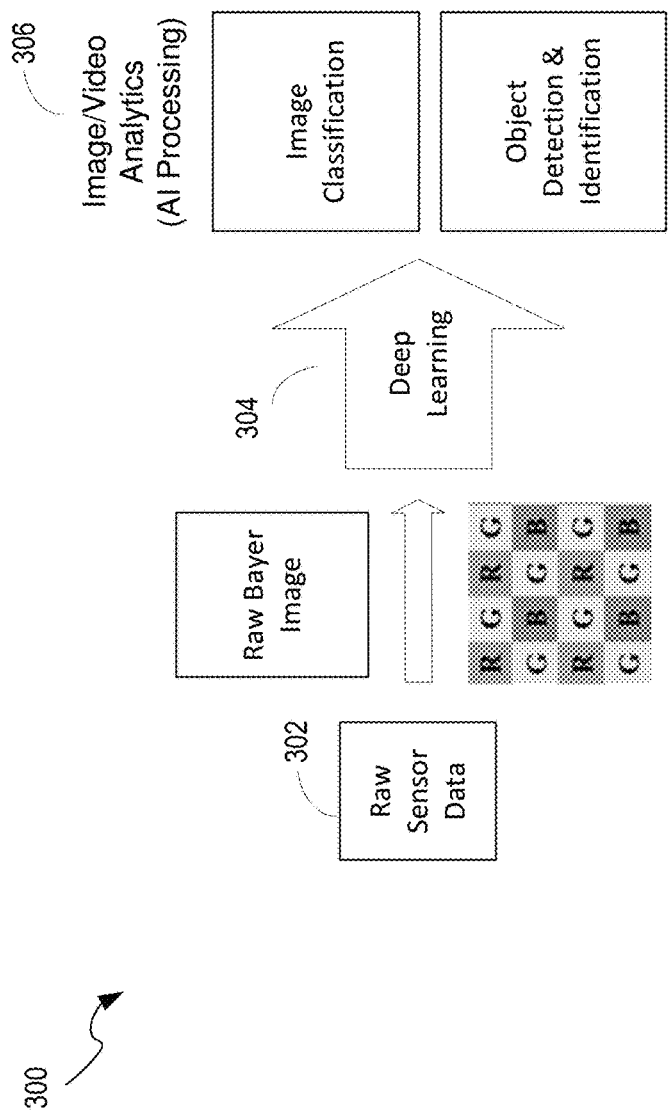
FIG. 3 is a block diagram of a direct conversion image processing system including a single deep learning component (e.g., CNN) that generates image analytics directly on raw Bayer image data from a sensor, in accordance with some aspects of the disclosure.

FIG. 3 is a block diagram of a direct conversion image processing system 300 including a single deep learning component (e.g., CNN) 304 that generates image analytics 306 directly on raw Bayer image data 302 from a sensor, in accordance with some aspects of the disclosure. The CNN 304 directly processes raw Bayer camera sensor data 302 to produce image/video analysis 306. This process is quite different from a trivial approach of using one CNN to perform the ISP function(s) and another CNN to perform the classification. In one aspect, the goal here is to have one CNN, about the same size as the original CNN processing RGB image data, that classifies an input image by directly processing the corresponding raw Bayer sensor image. This CNN can efficiently skip the traditional ISP steps and add significant value to edge computing solutions where latency, battery-power, and computing power are constrained.

One challenge for using a CNN as a direct Bayer image processor is the lack of raw Bayer sensor images that are labeled and suitable for training. To address this issue, this disclosure proposes using a generative model to train on unlabeled raw Bayer images to synthesize raw Bayer images given an input RGB dataset. This disclosure then proposes using this trained generative model to generate a labeled image dataset in the raw Bayer format given a labeled RGB image dataset. This disclosure then proposes to use the labeled raw Bayer images to train the model (e.g., CNN) that directly processes raw Bayer image data to generate image analytics such as object detection and identification. The generative model may be used to convert any RGB dataset into a raw Bayer dataset. The CNN and generative models were tested on the popular ImageNet dataset and the results were very promising. The experimental setup is highly generic and has various applications from optimization for edge computing to autonomous driving. In one aspect, the sensor 302 can generate raw RGB image data, and the CNN 304 can directly process the raw RGB image data.

Figure 4:
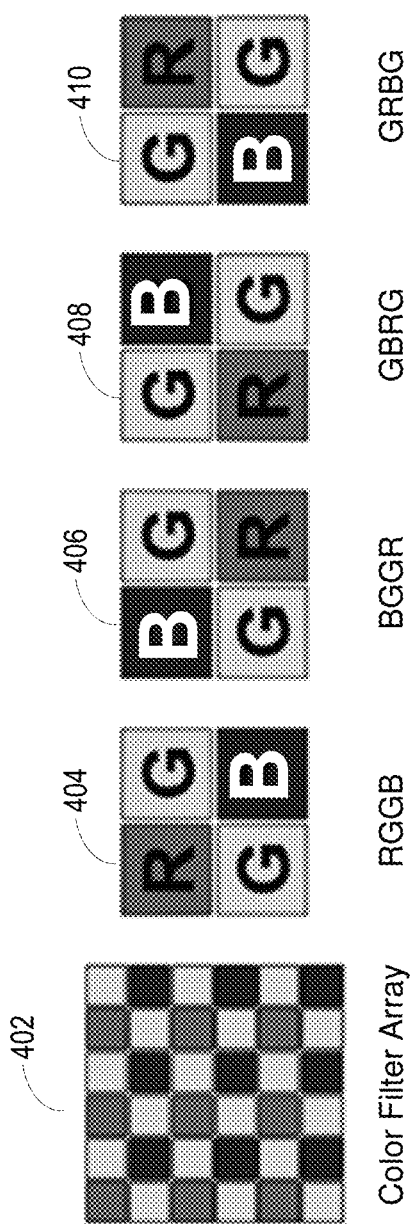
FIG. 4 illustrates an example color filter array and various color combination formats that can be used in different color filter arrays, in accordance with some aspects of the disclosure.

FIG. 4 illustrates an example color filter array 402 and various color combination formats that can be used in different color filter arrays, in accordance with some aspects of the disclosure. The various color combination formats include RGGB 404, BGGR 406, GBRG 408, and GRBG 410. A Bayer/Mosaic pattern specifies the particular arrangement of the color filter array used by a conventional camera. There are four possible arrangements/patterns showing how red, green, and blue pixels can be placed on the camera sensor. These arrangements are shown in FIG. 4. In one aspect, the number of green pixels is always doubled as compared to the number of red or blue pixels. This is because the human eye is more sensitive to green light, and most one-shot color (OSC) cameras have been designed for daylight use. For normal daylight RGB images, the green channel usually is a good approximation to the luminance component, where the human vision system perceives most of the detail.

Figure 5:
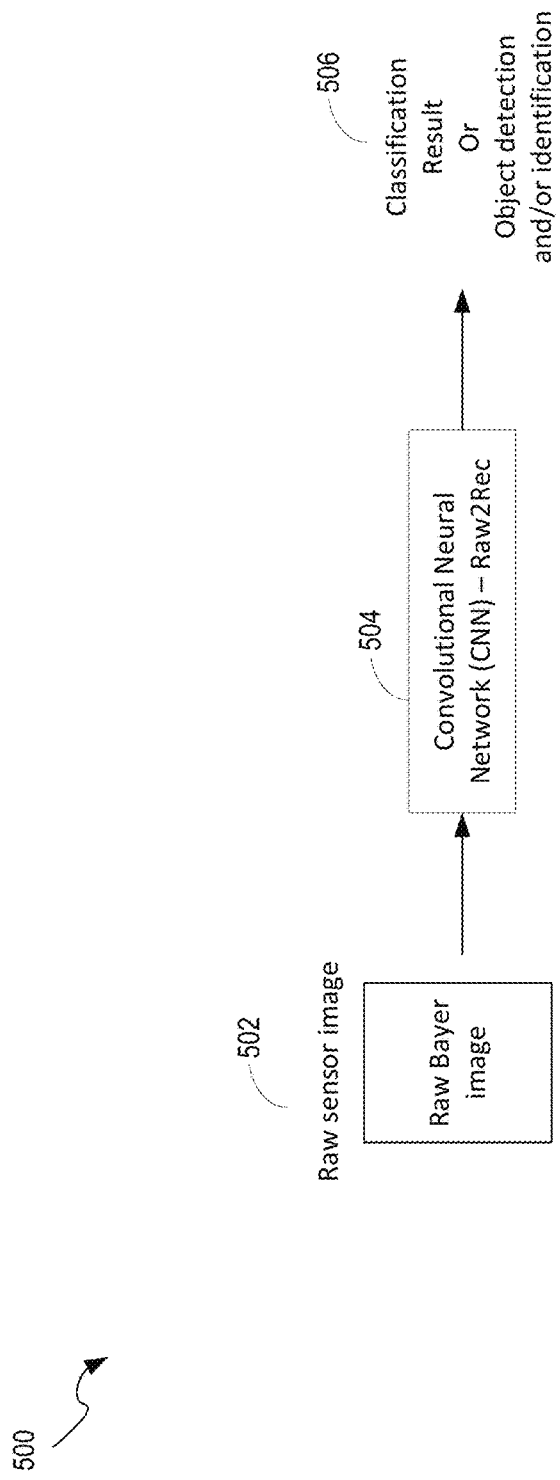
FIG. 5 is a block diagram of a direct conversion image processing system including a single convolution neural network (CNN) that generates image analytics using raw Bayer image data from a sensor, in accordance with some aspects of the disclosure.

FIG. 5 is a block diagram of a direct conversion image processing system 500 including a single convolution neural network (CNN) 504 that generates image analytics 506 using raw Bayer image data from a sensor 502, in accordance with some aspects of the disclosure. CNN 504 may be referred to as "Raw2Rec," representing direct processing of raw image data to direct recognition, thereby bypassing the need for performing ISP tasks. FIG. 1 shows various functional blocks of the ISP pipeline, the performance of which can be avoided, given that the task at hand, at least in some aspects, is to perform image analytics and not to display a high-quality image on a screen. While not bound by any particular theory, it is believed that this cannot be achieved by simply training a model on regular RGB images and then presenting raw Bayer images from the sensor to the trained model (e.g., it will not work since the raw Bayer image is statistically very different in distribution than an RGB image). Nor is it believed to be feasible to cascade two CNNs in a back-to-back configuration, one computing the ISP and the other computing the regular classification task (e.g., as this would significantly increase computation and memory requirements of such a processing system). Thus, in one aspect, an optimal solution (e.g., such as presented in FIG. 5) may involve using a single CNN (e.g., having about the same computation and memory capacity of a CNN classifying RGB images) to learn the mapping function of classification directly from the raw Bayer image data. Theoretically, the raw Bayer image has as much information as the RGB image. Hence a single CNN can learn the mapping function from the raw Bayer image to the output classes.

One of the biggest challenges for the Raw2Rec CNN 504 to function successfully includes training the Raw2Rec model. Training the Raw2Rec CNN 504 is extremely difficult due to the lack of any existing labeled raw Bayer images dataset. Most datasets that are available, and that are popular and well suited for training, are datasets containing RGB images with labels. For the Raw2Rec CNN to process the raw sensor Bayer image successfully, it is best to train with a labeled dataset that is very similar to the actual raw sensor Bayer images, including the statistical properties. Some of the characteristics of raw Bayer images include the presence of thermal noise from the sensor photoelectric diodes, variations due to manufacturing, the dead pixel phenomenon, the variation of noise characteristics with the difference in temperature, time, other physical parameters, variation in color, and the need for color correction. A CNN trained with raw Bayer images learns the functional mapping of the output class in such random variations, without the need to learn to map a visually esthetic appearance on a monitor. This eliminates the need to compute the ISP pipeline, thereby saving on computation cost, which translates to power savings and a reduction in the latency of producing the CNN output given an input frame.

In one aspect, the Raw2Rec CNN 504 meets one or more of the above noted design guidelines. In one aspect, the CNN 504 may be trained using another component (e.g., a generative model) in another configuration before being placed in service. This will be discussed in more detail below. In one aspect, the CNN 504 can be configured to perform image classification and/or object detection/identification/recognition.

In one aspect, the Raw2Rec CNN and the generative models can perform the same even if the input is raw RGB images instead of raw Bayer images. Some high-end cameras also generate raw RGB images and require similar ISP functionality to achieve RGB images that are visibly correct.

Figure 6:
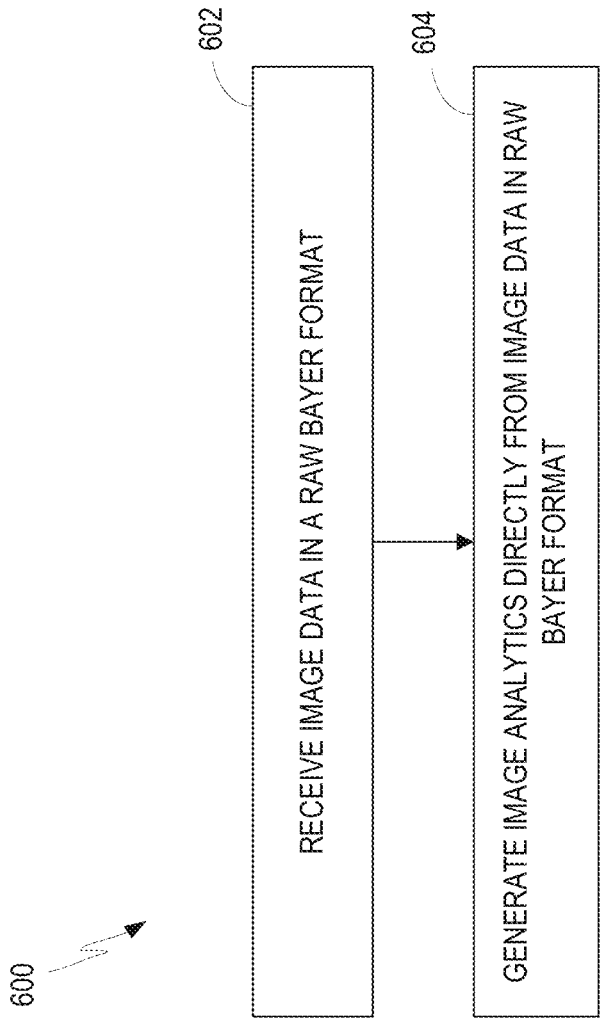
FIG. 6 is a flowchart of a process for generating image analytics directly from raw Bayer image data from a sensor, in accordance with some aspects of the disclosure.

FIG. 6 is a flowchart of a process 600 for generating image analytics directly from raw Bayer image data from a sensor, in accordance with some aspects of the disclosure. In one aspect, the process 600 can be performed by the Raw2Rec CNN 504 of FIG. 5. In block 602, the process receives image data in a raw Bayer format. In one aspect, this image may be captured using a sensor which generates corresponding image data in a raw Bayer format. In one aspect, this can be performed by a camera or other sensor, such as the sensor 502 of FIG. 5. In block 604, the process generates image analytics directly from the image data in the raw Bayer format. In one aspect, this and the actions of block 602 can be performed by a CNN, such as the CNN 504 of FIG. 5. In one aspect, the image analytics can include image classification, object detection, or some other useful image analytics that can be generated using machine learning. In one aspect, the process generates the image analytics using multiple steps. These steps could be that of a regular CNN, which include actions such as that the convolutional layers abstract the features while the following fully connect layers or FC layers perform the classification task. The convolutional layers can perform hierarchically. The initial convolutional layers abstract fundamental features that are similar to an edge detection filter, and the later layers abstract hierarchical features based on these features. Further, the later convolutional layers in a deep CNN can build even higher-level features from features detected in the lower convolutional layers. Increasing the number of layers does not always result in better performance as training deeper CNNs become a difficult task.

Figure 7:
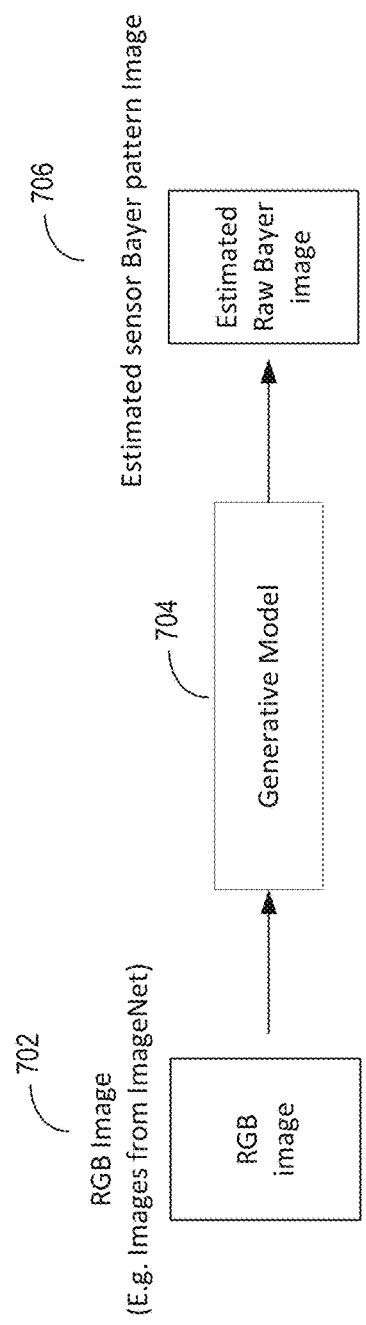
FIG. 7 is a block diagram of a generative model that is configured to map an RGB image to an estimated raw Bayer image and to help train a CNN for direct image conversion, in accordance with some aspects of the disclosure.

FIG. 7 is a block diagram of a generative model 704 that is configured to map an RGB image 702 to an estimated raw Bayer image 706 and to help train a CNN for direct image conversion, in accordance with some aspects of the disclosure. The generative model 704 may be implemented using one or more of an autoencoder, a variational autoencoder, and a generative adversarial network (GAN). Given a training set, generative models can learn to generate new data with the same statistics as the training set. Autoencoders and variational autoencoders can learn the mapping of an RGB image to its estimated raw Bayer counterpart by reducing the overall error of the generated image. GANs have been shown to produce state-of-the art results, especially in the domain of image creation. The fundamental principle of GANs is to approximate the unknown distribution of a given data set by optimizing an objective function through an adversarial game between a family of generators and a family of discriminators. The core idea of a GANs is based on the "indirect" training through the discriminator, which itself is also being updated dynamically. This basically means that the generator is not trained to minimize the distance to a specific image, but rather to fool the discriminator. This enables the model to learn in an unsupervised manner.

Figure 8:
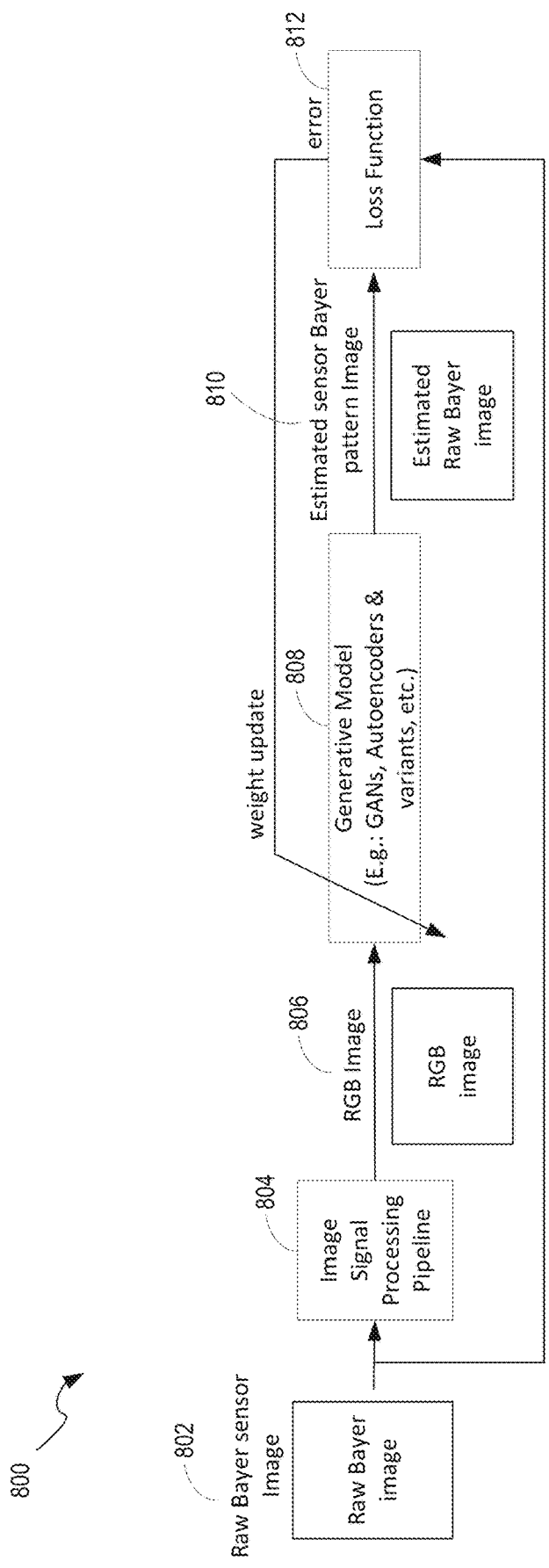
FIG. 8 is a block diagram of an example training system for training a generative model that can help train a CNN for direct image conversion, in accordance with some aspects of the disclosure.

FIG. 8 is a block diagram of an example training system 800 for training a generative model 808 that can help train a CNN for direct image conversion, in accordance with some aspects of the disclosure. In one aspect, the training system 800 can be viewed as an experimental setup to train the generative model 808. Given a raw Bayer sensor image 802, the ISP 804 produces the RGB image 806, and the generative model 808 then predicts the raw sensor Bayer image 810 derived from the RGB image 806, which is then compared against the raw Bayer sensor image using a loss function 812 (e.g., error generation circuitry). The loss function 812 then generates the error, which is backpropagated to update the weights of the generative model 808. These steps represent one training iteration, and will be repeated. The ISP 804 implements a well known mapping function for mapping from a raw Bayer input image to the RGB image. Since the ISP 804 can be a fixed function, the generative model 808 can train completely unsupervised. This makes the experimental setup practical, where, in reality, unlabeled raw Bayer images are easily available compared to labeled raw Bayer images, and there are plenty of labeled RGB images. A typical loss function that can be used is the cross-entropy loss function, but other suitable loss functions will work as well.

In one aspect, the raw Bayer images can be replaced with raw RGB images. In such case, the training process described in FIG. 8 remains unaltered.

Figure 9:
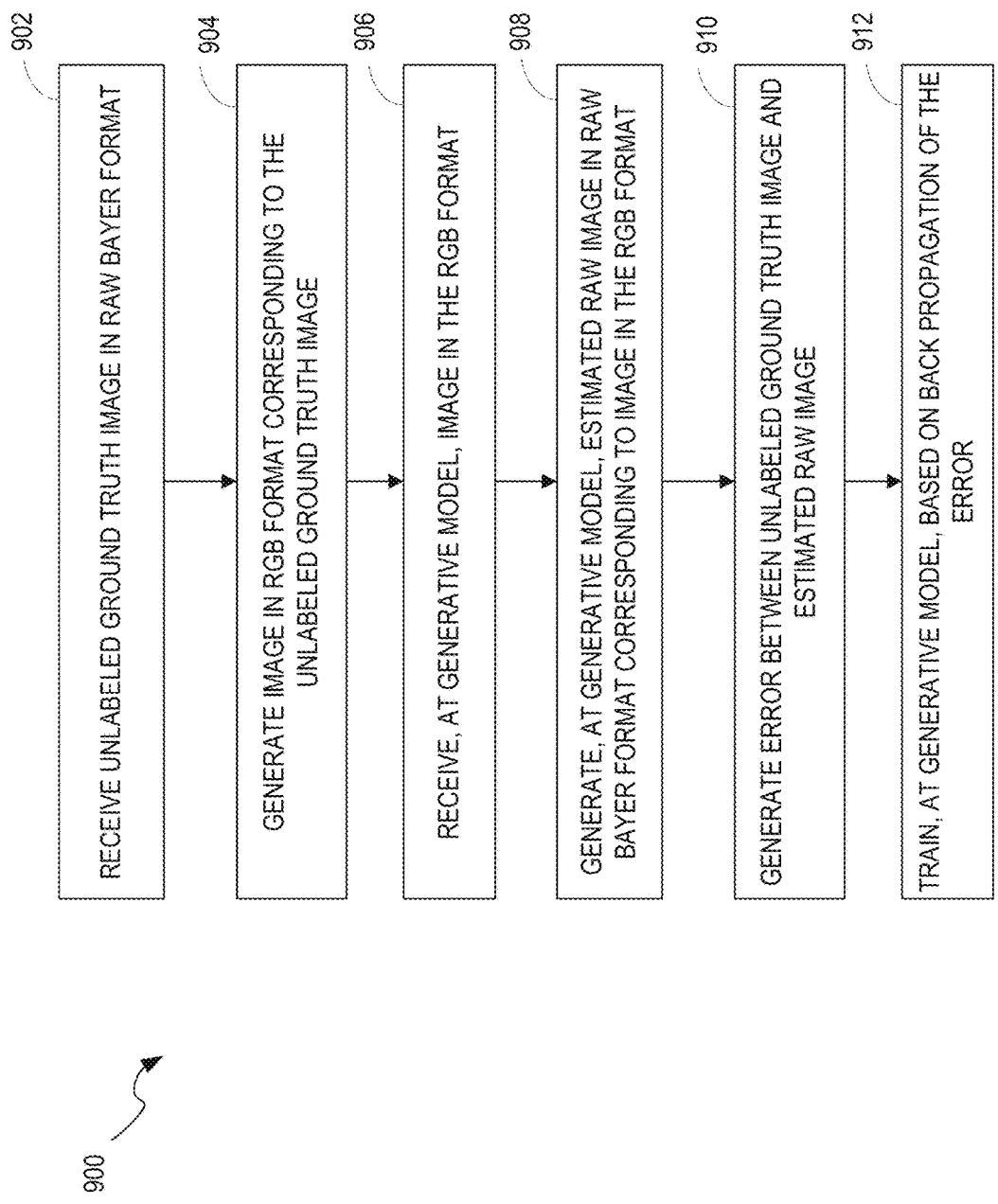
FIG. 9 is a flowchart of a process for training a generative model that can help train a CNN for direct image conversion, in accordance with some aspects of the disclosure.

FIG. 9 is a flowchart of a process 900 for training a generative model that can help train a CNN for direct image conversion, in accordance with some aspects of the disclosure. In one aspect, the process 900 can be performed using the system 800 of FIG. 8. In block 902, the process receives an unlabeled ground truth image in a raw Bayer format. In block 904, the process generates an image in a RGB format corresponding to the unlabeled ground truth image. In one aspect, the ISP 804 of FIG. 8 can perform the actions of blocks 902 and 904. In block 906, the process receives, at a generative model, the image in the RGB format. In block 908, the process generates, at the generative model, an estimated raw image in the raw Bayer format corresponding to the image in the RGB format. In one aspect, the generative model 808 of FIG. 8 can perform the actions of blocks 906 and 908. In block 910, the process generates an error between the unlabeled ground truth image and the estimated raw image. In one aspect, the loss function 812 of FIG. 8 can perform this action. In block 912, the process trains, at the generative model, based on a back propagation of the error. This process is iterative and may repeat until a preselected level of training or precision is reached.

Figure 10:
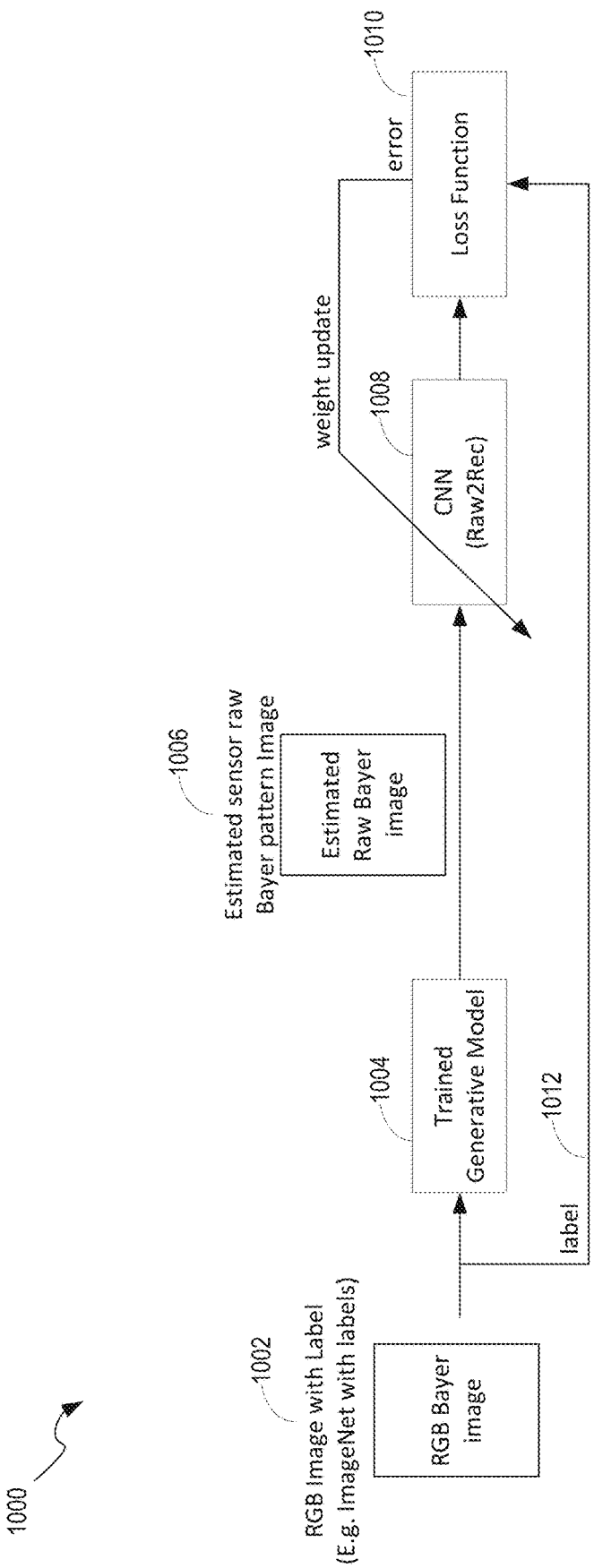
FIG. 10 is a block diagram of an example training system for training a CNN for direct image conversion using a trained generative model, in accordance with some aspects of the disclosure.

FIG. 10 is a block diagram of an example training system 1000 for training a CNN 1008 (Raw2Rec) for direct image conversion using a trained generative model 1004, in accordance with some aspects of the disclosure. The CNN training system 1000 includes a dataset of RBG images 1002 (e.g., ImageNet with labels), the trained generative model 1004 that receives an RBG image 1002 and generates an estimated Bayer pattern image 1006 (e.g., an unlabeled image), the CNN 1008 which receives the estimated Bayer pattern image 1006 and generates an estimated label. The CNN training system 1000 also includes a loss function 1010, which receives the estimated label and the true label 1012 from the RBG image dataset 1002 and generates an error that gets back propagated to the CNN 1008.

The training of the Raw2Rec CNN 1008 can be supervised, meaning at training, the model 1008 is presented with an image, and its expected output class, the labels. The model 1008 then learns the mapping function over multiple iterations, where a weight update at every iteration reduces the error generated by the loss function. In one aspect, the loss function 1010 can be implemented using a cross-entropy loss function. This setup, as shown in FIG. 10, in conjunction with the setup in FIG. 8 for training the generative model allows training of the Raw2Rec CNN to directly process the raw Bayer image data without having a raw labeled Bayer image dataset. Instead, the unsupervised learning technique is used for the generative model to generate a labeled estimated Bayer dataset by only possessing an unlabeled raw Bayer dataset. In one aspect, a small quantity of raw Bayer images can be manually labeled to check the sanity of the combined experimental setups shown in FIG. 8 and FIG. 10. Thus, use of this CNN training system 1000, and/or the generative model training system 800, provides advantages as there are plenty of existing labeled RGB datasets available to use for training the Raw2Rec CNN 1008.

In one aspect, the loss function 1010 (e.g., error generation circuitry) can be implemented using one or more of a loss function, a cross-entropy loss function, or a mean squared loss function.

In one aspect, the raw Bayer images can be replaced with raw RGB images. In such case, the training process described in FIG. 10 remains unaltered.

Figure 11:
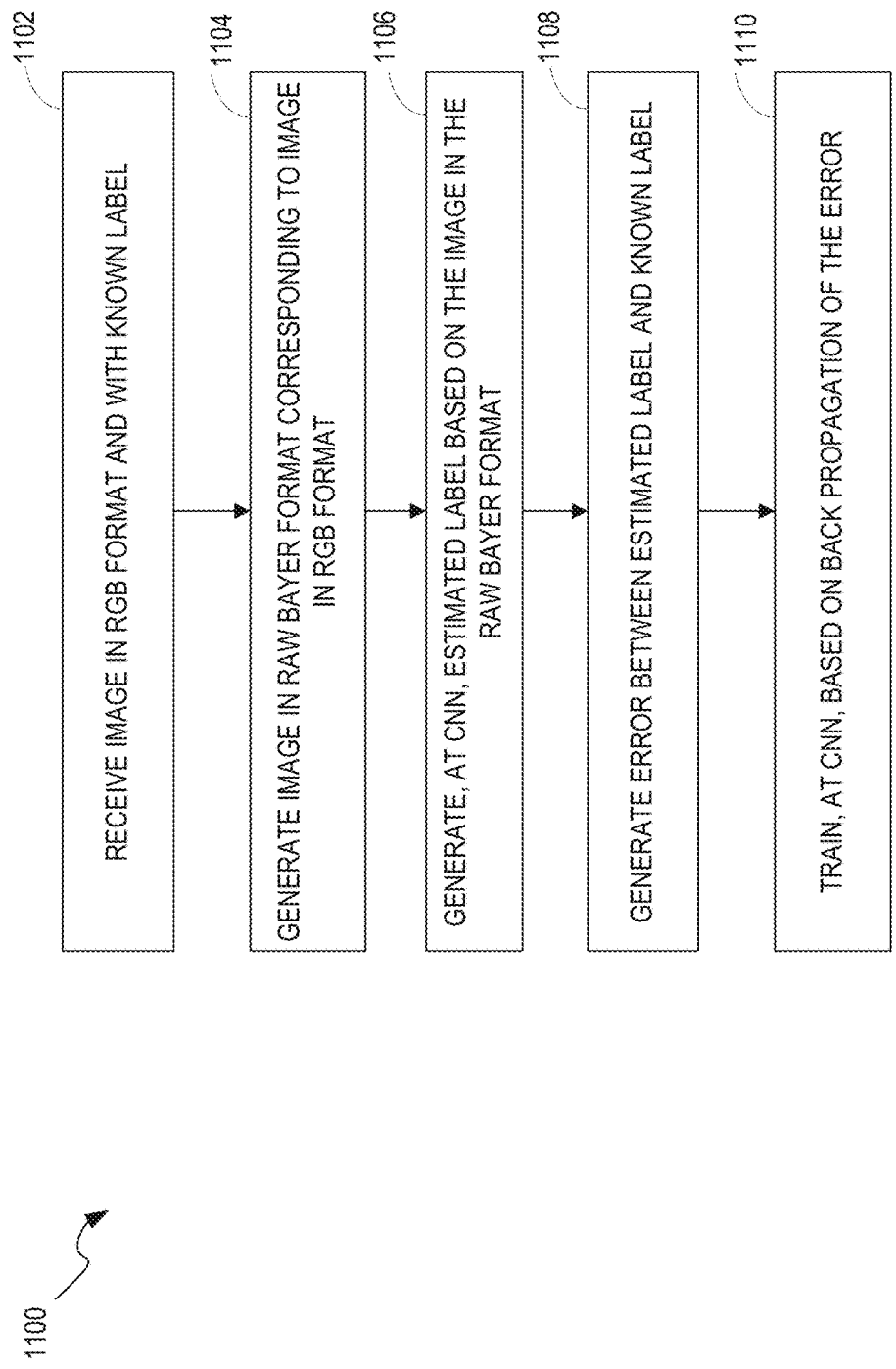
FIG. 11 is a flowchart of a process for training a CNN for direct image conversion using a trained generative model, in accordance with some aspects of the disclosure.

FIG. 11 is a flowchart of a process 1100 for training a CNN for direct image conversion using a trained generative model, in accordance with some aspects of the disclosure. In one aspect, the process 1100 can be performed by the CNN training system 1000 of FIG. 10. In block 1102, the process receives an image in an RGB format and with a known label. In one aspect, this action can be performed by the trained generative model 1004 of FIG. 10, which receives an RGB image (or dataset) 1002 and the associated/corresponding label 1012. In block 1104, the process generates an image in a raw Bayer format corresponding to the image in the RGB format. In one aspect, this action can be performed by the trained generative model 1004 of FIG. 10 in generating the estimated Bayer pattern image 1006.

In block 1106, the process, generates, at the CNN, an estimated label based on the image in the raw Bayer format. In one aspect, this can be performed by CNN 1008 of FIG. 10. In block 1108, the process generates an error between the estimated label and the known label. In one aspect, this can be performed by the loss function 1010 of FIG. 10. In block 1110, the process trains, at the CNN, based on a back propagation of the error. In one aspect, this involves updating one or more weights of the CNN model 1008.

Figure 12:
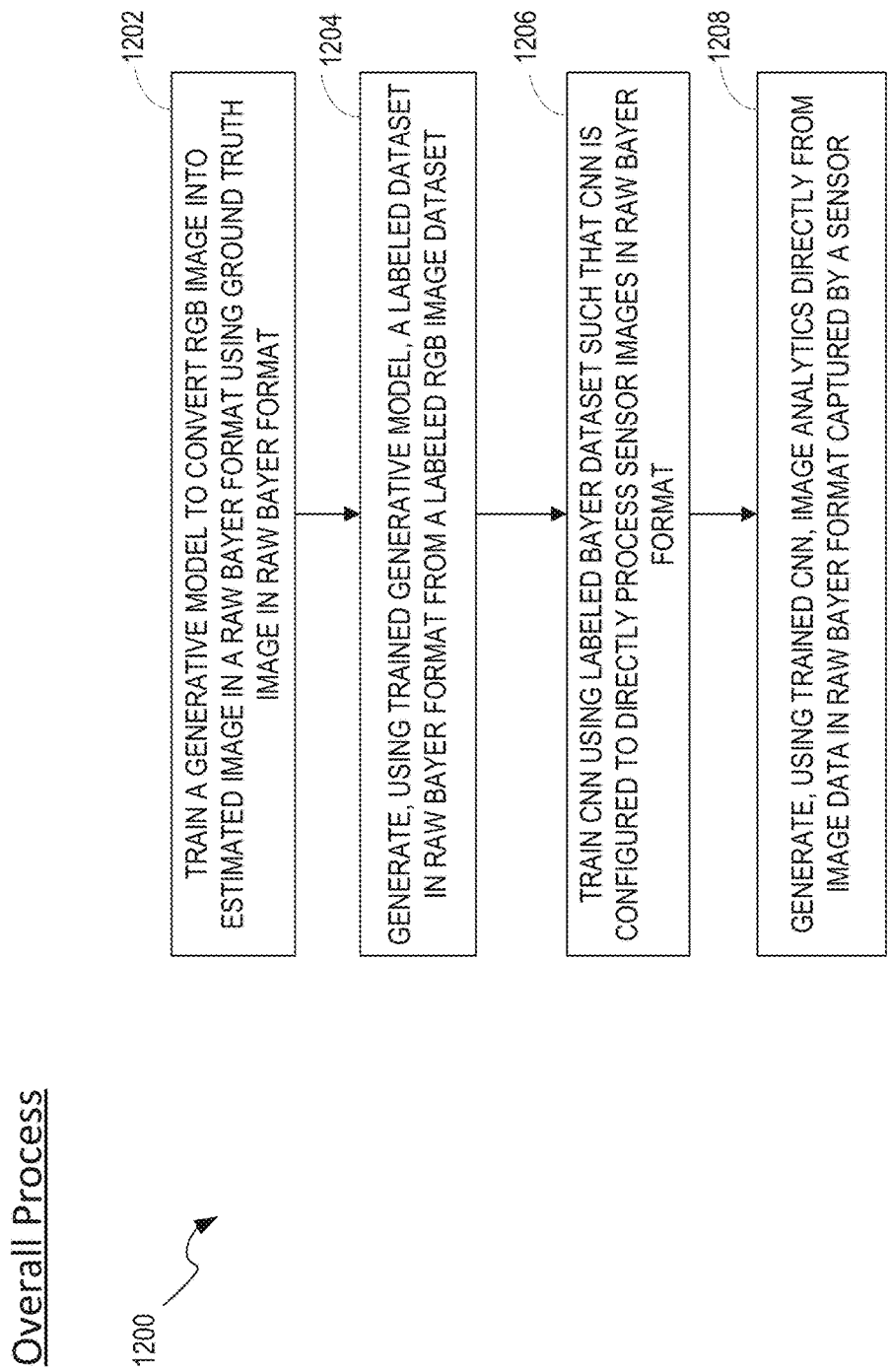
FIG. 12 is a flowchart of an overall process for training a generative model and then training a CNN for direct image conversion using the trained generative model, in accordance with some aspects of the disclosure.

FIG. 12 is a flowchart of an overall process 1200 for training a generative model and then training a CNN for direct image conversion using the trained generative model, in accordance with some aspects of the disclosure. In one aspect, the process 1200 can be performed using the systems of FIGS. 8, 10 and 5. In block 1202, the process trains a generative model to convert an RGB image into an estimated image in a raw Bayer format using a ground truth image in the raw Bayer format. In one aspect, this can be performed by the system of FIG. 8. In block 1204, the process generates, using the trained generative model, a labeled dataset in the raw Bayer format from a labeled RGB image dataset. In one aspect, this can be performed by the system of FIG. 10. In block 1206, the process trains a convolution neural network (CNN) using the labeled Bayer dataset such that the CNN is configured to directly process sensor images in the raw Bayer format. In one aspect, this can be performed by the system of FIG. 10. In block 1208, the process generates, using the trained CNN, image analytics directly from image data in the raw Bayer format captured by a sensor. In one aspect, this can be performed by the system (e.g., Raw2Rec CNN 504) of FIG. 5.

Figure 13:
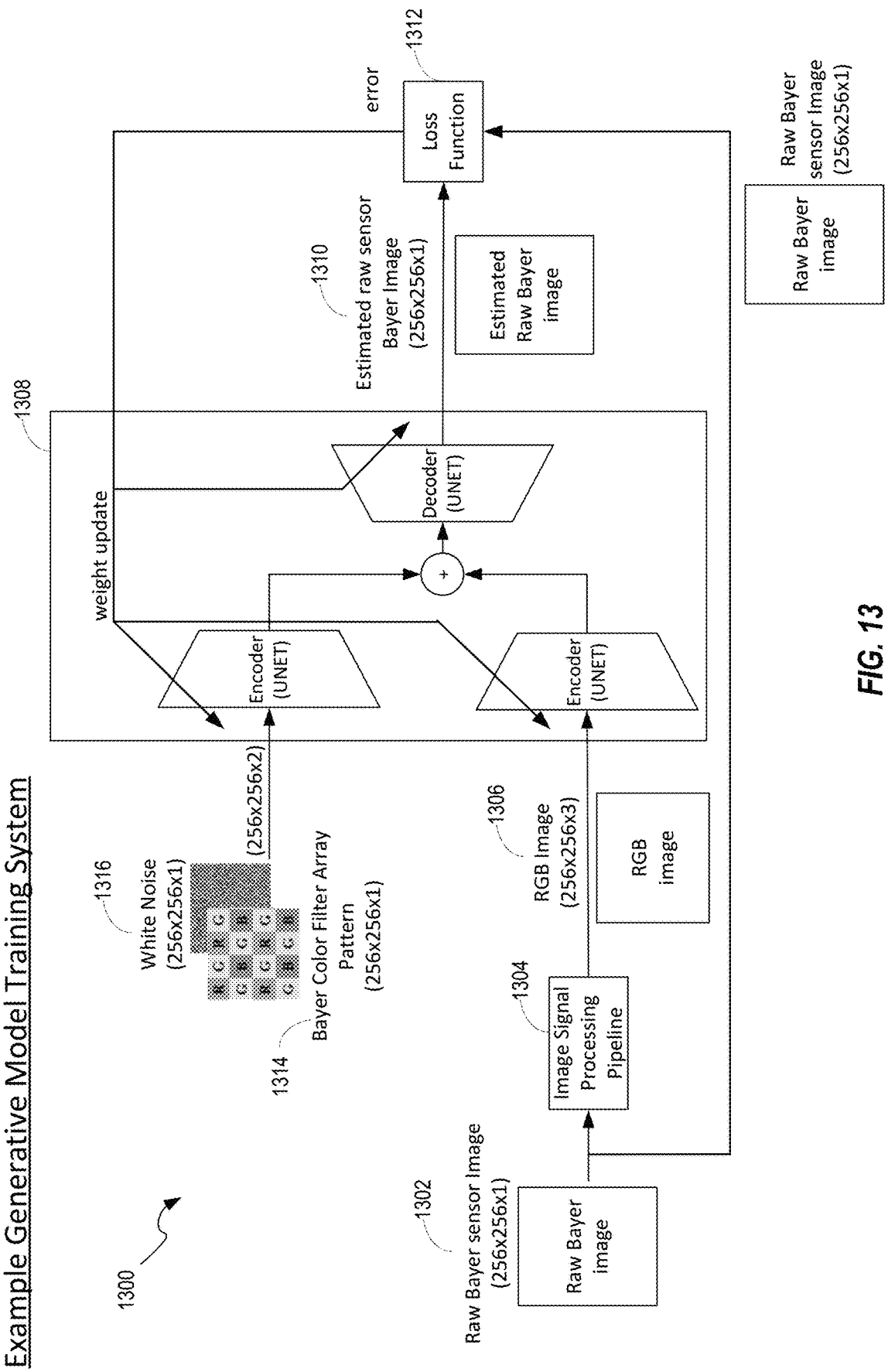
FIG. 13 is a block diagram of an example training system for training an example architecture for a generative model, in accordance with some aspects of the disclosure.

FIG. 13 is a block diagram of an example training system 1300 for training an example architecture for a generative model, in accordance with some aspects of the disclosure. Similar to FIG. 8, the example architecture 1300 works such that given a raw Bayer sensor image 1302, the ISP 1304 produces the RGB image 1306, and the generative model 1308 then predicts the raw sensor Bayer image 1310, which is then compared against the raw Bayer sensor image using a loss function 1312 (e.g., error generation circuitry). The loss function 1312 then generates the error, which is back-propagated to update the weights of the generative model 1308. These steps represent one training iteration, and will be repeated.

Figure 16:
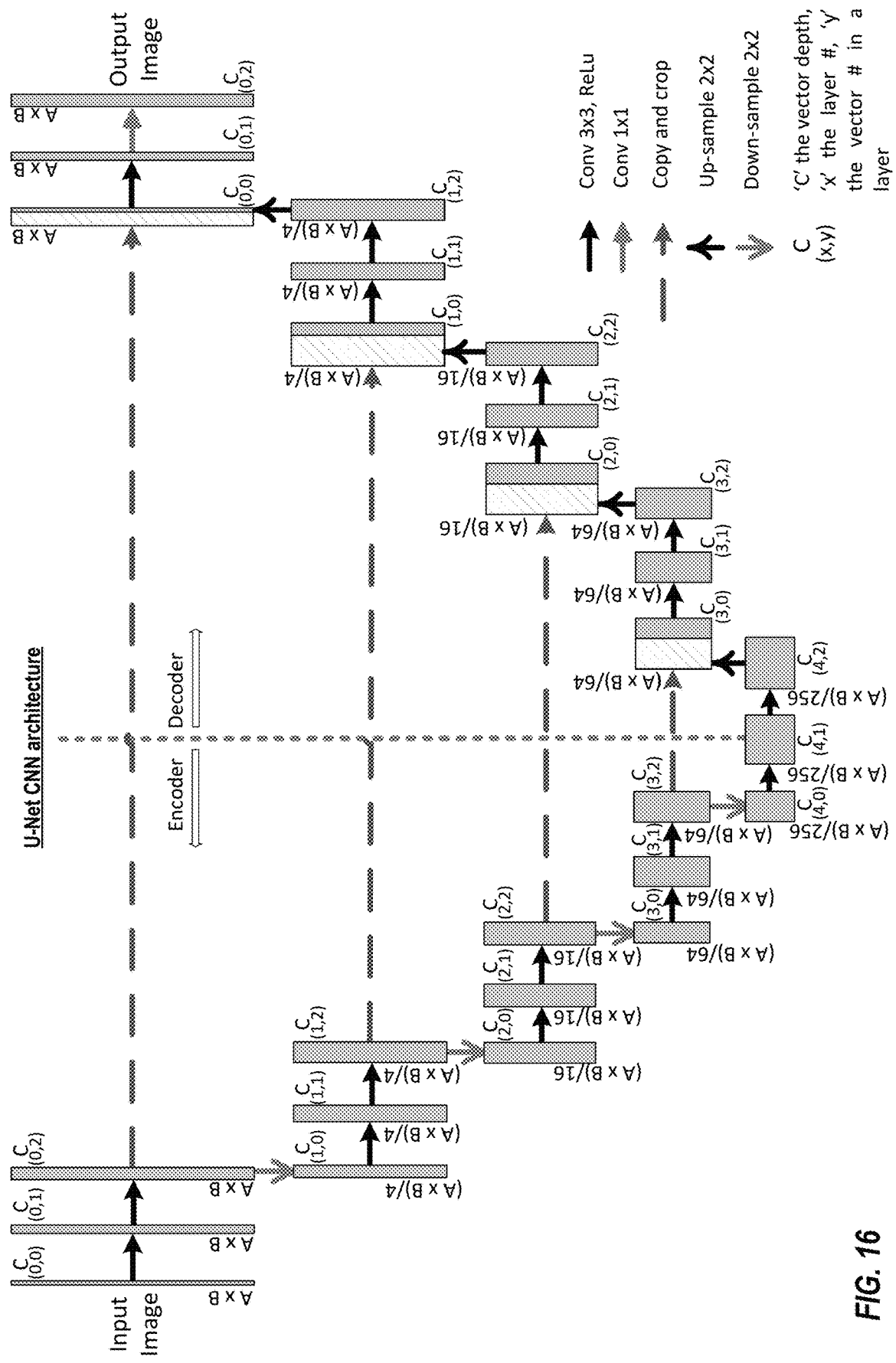
FIG. 16 is a block diagram of an example U-Net CNN architecture that can be used as an autoencoder for a generative model, in accordance with some aspects of the disclosure.
Figure 17:
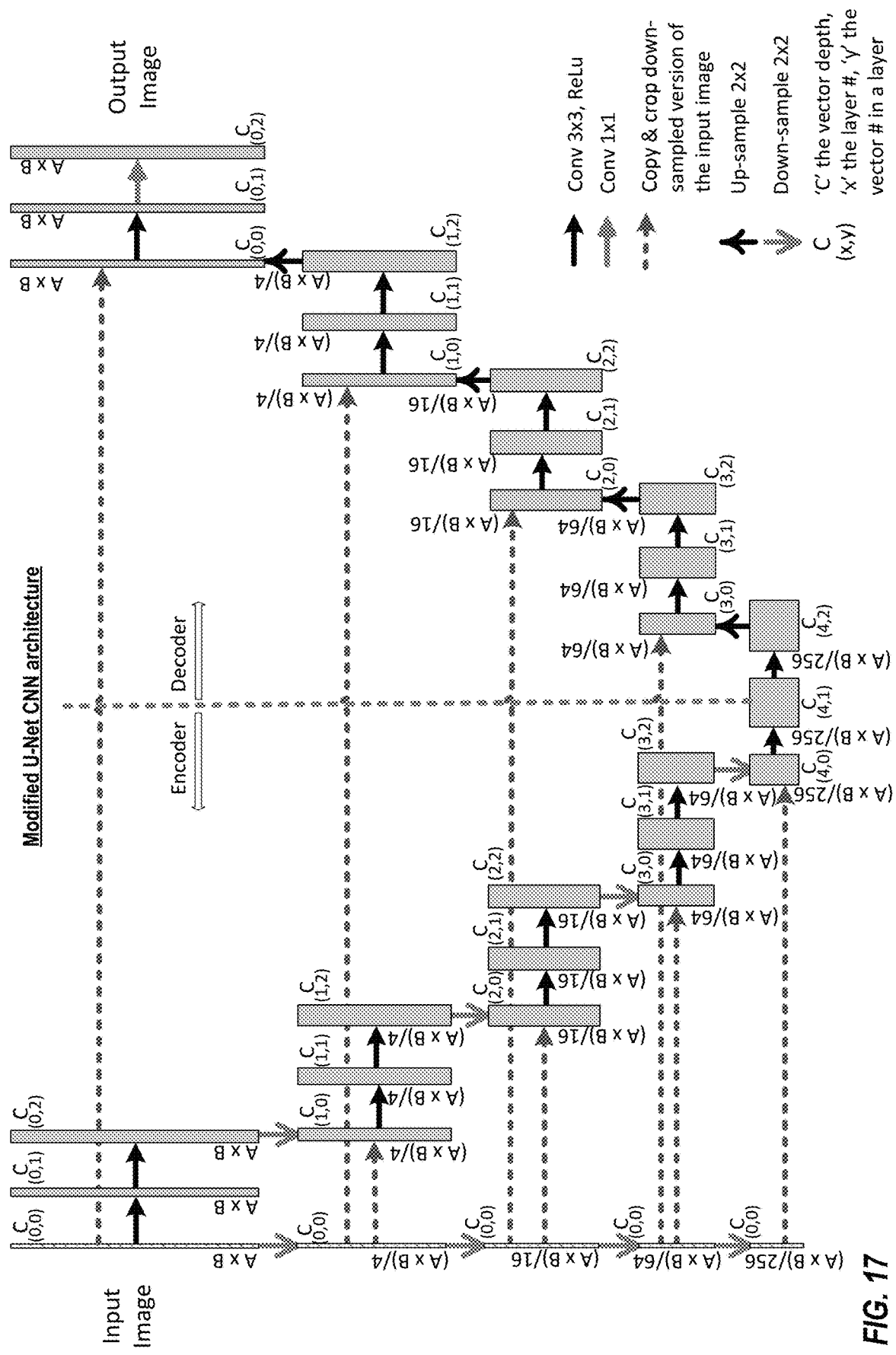
FIG. 17 is a block diagram of an example modified U-Net CNN architecture that can be used as an autoencoder for a generative model, in accordance with some aspects of the disclosure.

The experimental setup of FIG. 13 is used to train the example generative model 1308 to learn the mapping function from the RGB image 1306 to an estimated raw sensor Bayer image 1310. The model also inputs the Bayer pattern 1314 and white noise 1316. The second arm of the encoder arm learns the mapping of the noise variable present in real Bayer sensor data with respect to the Bayer pattern. The combined latent space from both the encoders is combined before feeding to the decoder, which maps the final output image. The popular encoder and decoder from the U-Net model was used for the respective encoder and decoder components, and a cross-entropy loss function was used for the experiment. Other suitable components can be used as well. In one aspect, the generative model 1308 can be trained over the entire ImageNet dataset. In FIG. 16, a standard U-Net model is shown that can be used in the generative model 1308. In FIG. 17, an optimized version of U-Net is shown that can be used in the generative model 1308.

Figure 14:
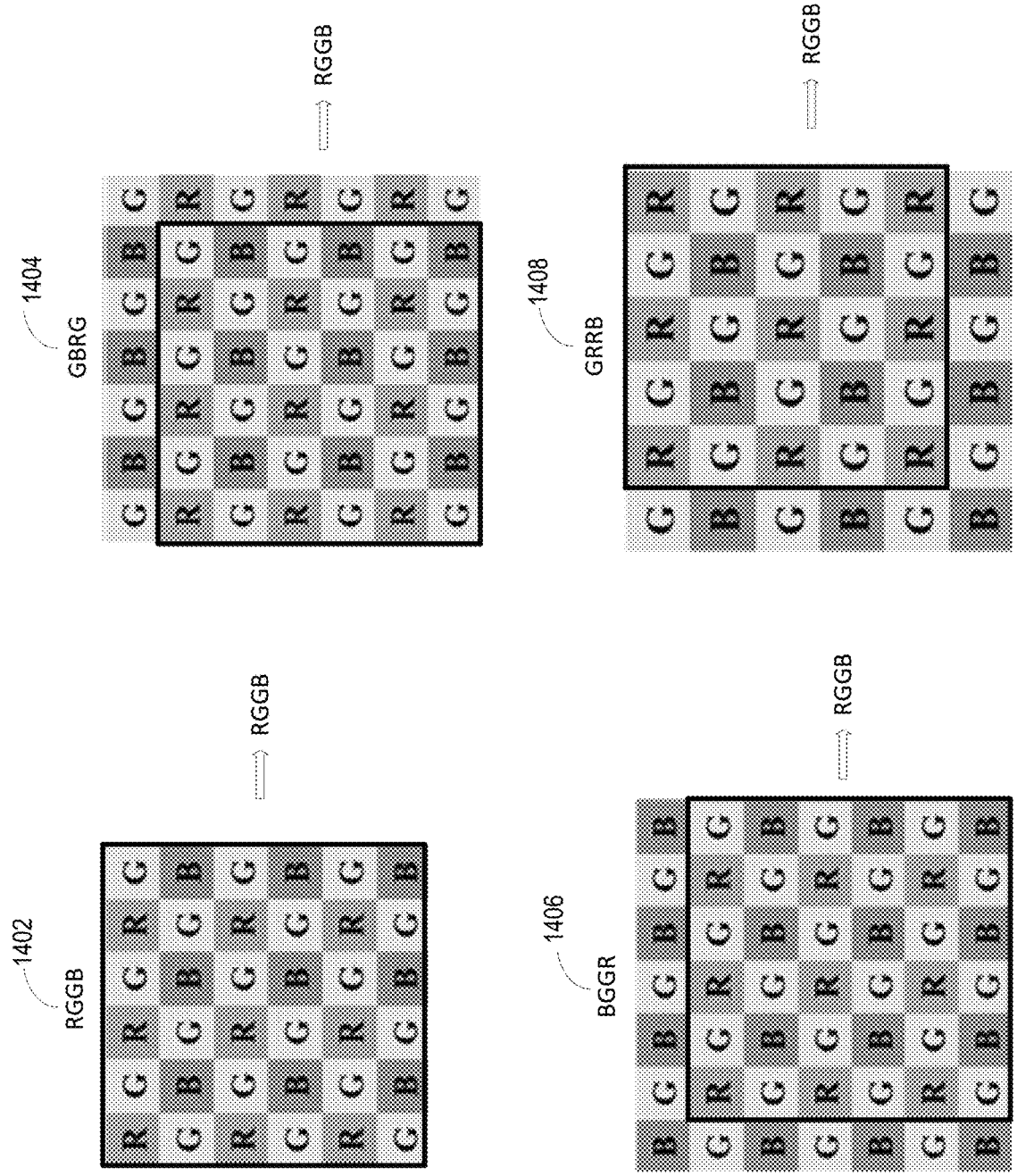
FIG. 14 illustrates four different example color filter array (CFA) patterns and various techniques for extracting a single CFA pattern (e.g., RGGB) from each of the different CFA patterns, in accordance with some aspects of the disclosure.

FIG. 14 illustrates four different example color filter array (CFA) patterns and various techniques for extracting a single CFA pattern (e.g., RGGB) from each of the different CFA patterns (1402, 1404, 1406, 1408), in accordance with some aspects of the disclosure. FIG. 14 effectively shows how to transform any of the four patterns to an RGGB pattern and then feed the transformed RGGB pattern to the Raw2Rec CNN. In one aspect, a pixel shift operation is performed on any of the GBRG, BGGR, or GRRB patterns to achieve the RGGB Bayer pattern as shown in the example of FIG. 14.

Returning briefly to FIG. 4, which shows the four popular CFA supported Bayer patterns. The Raw2Rec CNN model as shown in FIG. 5 (or in any of the other drawings) could essentially receive any of the four Bayer patterns at runtime. It becomes a daunting task to train separate models of the generative model for each of the possible CFA Bayer patterns. As such, this disclosure proposes to train the generative model using a single Bayer pattern, and at run time, adapt the input Bayer image as desired. In one example, the generative model is trained with only the RGGB pattern, and hence the system only needs to input the RGGB pattern at the input of the Raw2Rec CNN at runtime. As mentioned above, FIG. 10 shows how to transform any of the four patterns to the RGGB pattern and then feed the transformed RGGB pattern to the Raw2Rec CNN.

Figure 15:
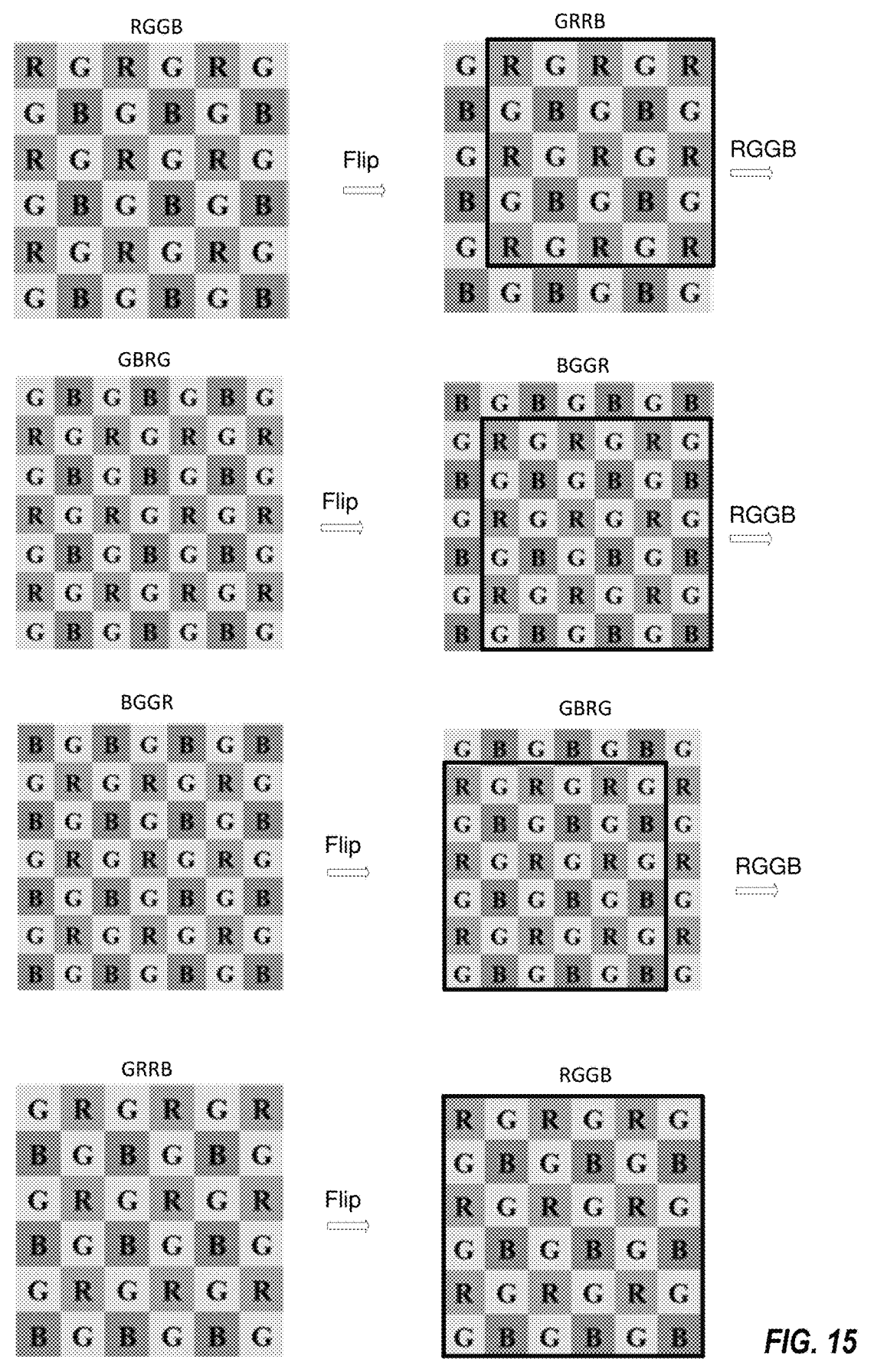

FIG. 15 illustrates a method to choose the selection of pixels to maintain a single CFA pattern (e.g., RGGB) throughout a training process, in accordance with some aspects of the disclosure. Data augmentation has become standard practice at training, which involves flipping images, turning images by +90 or −90 degrees, and/or cropping the images. This all serves to generate a larger training dataset. Since the RGGB Bayer pattern was chosen as a default training pattern, FIG. 15 shows the method to choose the selection of the pixels to maintain the RGGB pattern throughout the training. The key is to perform a pixel shift and extract the desired RGGB pattern before the image is used for training. The same principle applies to turning the image by +90 or −90 degrees and cropping.

FIG. 16 is a block diagram of an example U-Net CNN architecture that can be used as an autoencoder for a generative model, in accordance with some aspects of the disclosure. In one aspect, this architecture can be used in the generative model 1308 of FIG. 13. More specifically, the example generative model 1308 shown in FIG. 13 uses the encoder (all components to left of vertical dashed line in FIG. 16) and decoder (all components to right of vertical dashed line in FIG. 16) from a U-Net architecture. The standard U-Net model is presented in FIG. 16. In FIG. 16, each gray box corresponds to a multi-channel feature map, and each box is indicated by a horizontal and vertical dimension (A×B), and the depth C(a,b) corresponding to 'a' layer and 'b' position within a layer.

U-Net is one of the most popular autoencoder models for performing different image enhancement techniques and in medical imaging. The input image in a U-Net passes through various convolutional layers before decimation using the pooling layer. This process continues until the decimation function has been achieved four times at the encoder side. Each of the decimation layers is considered a scale, both at the encoder and the decoder. The output of each scale layer is passed into the decoder layer from the encoder side. This requires storing the output of four convolutional layers and being consumed at the decoder layer on the same scale at a different time. This increases the storage requirement of intermediate data (e.g., at runtime). This is generic to any encoder-decoder structure. The U-Net architecture first showed that passing the data from the encoder to the decoder significantly helps in training at the cost of huge storage requirements. FIG. 16 shows all the parameters used by the U-Net model.

FIG. 17 is a block diagram of an example modified U-Net CNN architecture that can be used as an autoencoder for a generative model, in accordance with some aspects of the disclosure. In one aspect, this architecture can be used in the generative model 1308 of FIG. 13. In FIG. 17, a modified U-Net architecture is presented. In FIG. 17, each gray box corresponds to a multi-channel feature map, and each box is indicated by a horizontal and vertical dimension (A×B), and the depth C(a,b) corresponding to 'a' layer and 'b' position within a layer.

In this architecture, we scale the input to various sizes and pass the scaled input image to each of the encoder (all components to left of vertical dashed line in FIG. 17) and decoder (all components to left of vertical dashed line in FIG. 17) scale layers. In this method, the modified architecture avoids sending the volume of computed output from the encoder layer to the decoder layer in contrast to a typical U-Net. As a result, the system avoids storing a huge volume of data at each of the scale layers and having to pass it from the encoder to the decoder layer. This results in an architecture that is closer to the traditional autoencoder structure but by passing scaled input image to the encoder and decoder, the architecture significantly improves performance and reduces the overall training time. At a maximum, this technique only increases the number of channels at every scale layer of the encoder and decoder by the number of channels of the input. Suppose the increase in the number of channels at every scale is not desirable, then at each layer, the previous layer output could be reduced by this same amount to keep the overall computational cost the same. The different input image resolutions required at encoder and decoder could be either pre-computed or computed at the place where it is needed, based on the objective to trade memory usage for computation or vice versa. In another implementation, instead of using a scaled copy of the input image at each encoder and decoder layer, the scaled copy could be used only at the decoder layers. This further reduces computation and memory requirements. The drop in performance is minimal with such a compromise.

In one aspect, the generative model includes a convolutional neural network (CNN) having a modified U-Net architecture (as in FIG. 17) including an encoder layer and a decoder layer, where the generative model is configured to generate a scaled input image and pass it to each of the encoder layer and the decoder layer. The modified U-Net architecture of FIG. 17 removes the requirement to pass the output from various stages of the encoder to the decoder side, as is the case in a regular U-Net. In general, autoencoders are twice as deep than their classification CNN counterparts. This makes them very difficult to train. Passing outputs from the encoder to the decoder has been widely used in literature, inspired from the U-Net which is expensive in terms of storing the encoder output data and increases the computational cost at the decode. This method of passing the scaled input image to different stages of the encoder and decoder significantly saves in storage cost and computation cost at the decode. Interestingly it also aids in training the autoencoder much faster than a regular autoencoder.

FIG. 18 is a table listing parameters that can be used for a CNN configured to perform direct image conversion, in accordance with some aspects of the disclosure. More specifically, Table 1 or FIG. 18 describes the model comparison parameters of an example Raw2Rec CNN (e.g., such as Raw2Rec CNN 504 in FIG. 5). An input dimension of 512×512×1 Bayer image is assumed for the example, and the output is a classification of 1000 classes. The model described in Table-1 is very similar to DarkNet-19. The original DarkNet-19 had a performance of 76.4% for Top-1 accuracy and 93.5% Top-5 accuracy. The Raw2rec CNN model achieves a 75.8% Top-1 accuracy and 92.4% Top-1 accuracy on raw Bayer input images with identical computation and lower memory requirements as compared to the original model. With similar performance and resource requirements, our example Raw2Rec CNN model does not require the ISP functionality.

Figure 19:
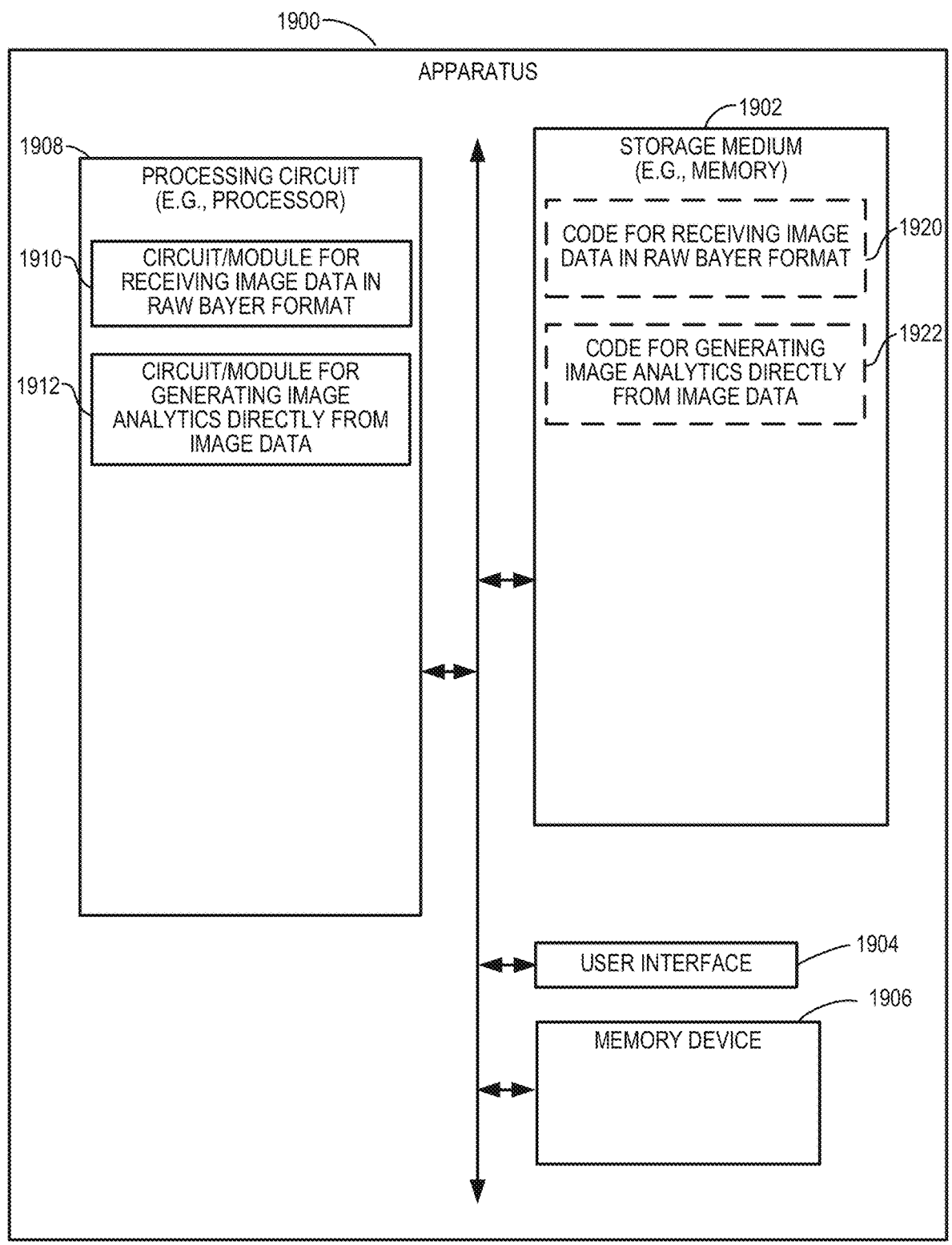
FIG. 19 is a block diagram illustrating an example hardware implementation for an apparatus that can support direct conversion of image data in a Bayer format to image analytics in accordance with some aspects of the disclosure.

FIG. 19 is a block diagram illustrating an example hardware implementation for an apparatus (e.g., an electronic device such as such a Raw2Rec CNN) 1900 that can support direct conversion of image data in a Bayer format to image analytics in accordance with some aspects of the disclosure. The apparatus 1900 includes a storage medium 1902, a user interface 1904, a memory device (e.g., a memory circuit) 1906, and a processing circuit 1908 (e.g., at least one processor). In various implementations, the user interface 1904 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 19. The signaling bus may include any number of interconnecting buses and bridges depending on the specific application of the processing circuit 1908 and the overall design constraints. The signaling bus links together various circuits such that each of the storage medium 1902, the user interface 1904, and the memory device 1906 are coupled to and/or in electrical communication with the processing circuit 1908. The signaling bus may also link various other circuits (not shown) such as timing sources, peripherals, voltage regulators, and power management circuits, which are well known in the art, and therefore, will not be described any further.

The memory device 1906 may represent one or more memory devices. In some implementations, the memory device 1906 and the storage medium 1902 are implemented as a common memory component. The memory device 1906 may also be used for storing data that is manipulated by the processing circuit 1908 or some other component of the apparatus 1900.

The storage medium 1902 may represent one or more computer-readable, machine-readable, and/or processor-readable devices for storing programming, such as processor executable code or instructions (e.g., software, firmware), electronic data, databases, or other digital information. The storage medium 1902 may also be used for storing data that is manipulated by the processing circuit 1908 when executing programming. The storage medium 1902 may be any available media that can be accessed by a general purpose or special purpose processor, including portable or fixed storage devices, optical storage devices, and various other mediums capable of storing, containing or carrying programming.

By way of example and not limitation, the storage medium 1902 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, a key drive, or a solid state drive (SSD)), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1902 may be embodied in an article of manufacture (e.g., a computer program product). By way of example, a computer program product may include a computer-readable medium in packaging materials. In view of the above, in some implementations, the storage medium 1902 may be a non-transitory (e.g., tangible) storage medium. For example, the storage medium 1902 may be a non-transitory computer-readable medium storing computer-executable code, including code to perform operations as described herein.

The storage medium 1902 may be coupled to the processing circuit 1908 such that the processing circuit 1908 can read information from, and write information to, the storage medium 1902. That is, the storage medium 1902 can be coupled to the processing circuit 1908 so that the storage medium 1902 is at least accessible by the processing circuit 1908, including examples where at least one storage medium is integral to the processing circuit 1908 and/or examples where at least one storage medium is separate from the processing circuit 1908 (e.g., resident in the apparatus 1900, external to the apparatus 1900, distributed across multiple entities, etc.).

Programming stored by the storage medium 1902, when executed by the processing circuit 1908, causes the processing circuit 1908 to perform one or more of the various functions and/or process operations described herein. For example, the storage medium 1902 may include operations configured for regulating operations at one or more hardware blocks of the processing circuit 1908.

The processing circuit 1908 is generally adapted for processing, including the execution of such programming stored on the storage medium 1902. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1908 is arranged to obtain, process and/or send data, control data access and storage, issue commands, and control other desired operations. The processing circuit 1908 may include circuitry configured to implement desired programming provided by appropriate media in at least one example. For example, the processing circuit 1908 may be implemented as one or more processors, one or more controllers, and/or other structure configured to execute executable programming. Examples of the processing circuit 1908 may include a general purpose processor, a graphics processing unit (GPU), a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1908 may also be implemented as a combination of computing components, such as a combination of a GPU and a microprocessor, a DSP and a microprocessor, a number of microprocessors, one or more microprocessors in conjunction with a DSP core, an ASIC and a microprocessor, or any other number of varying configurations. These examples of the processing circuit 1908 are for illustration and other suitable configurations within the scope of the disclosure are also contemplated.

According to one or more aspects of the disclosure, the processing circuit 1908 may be adapted to perform any or all of the features, processes, functions, operations and/or routines for any or all of the apparatuses described herein. For example, the processing circuit 1908 may be configured to perform any of the steps, functions, and/or processes described with respect to FIGS. 5, 6, 10, 11, and 12. As used herein, the term "adapted" in relation to the processing circuit 1908 may refer to the processing circuit 1908 being one or more of configured, employed, implemented, and/or programmed to perform a particular process, function, operation and/or routine according to various features described herein.

The processing circuit 1908 may be a specialized processor, such as a GPU or an application-specific integrated circuit (ASIC) that serves as a means for (e.g., structure for) carrying out any one of the operations described in conjunction with FIGS. 5, 6, 10, 11, and 12. The processing circuit 1908 serves as one example of a means for performing the functions of any of the circuits/modules contained therein. In various implementations, the processing circuit 1908 may provide and/or incorporate, at least in part, the functionality described above for the machine learning architectures of FIGS. 5, 6, 10, 11, and 12.

According to at least one example of the apparatus 1900, the processing circuit 1908 may include one or more of a circuit/module for receiving image data in a raw Bayer format 1910, a circuit/module for generating image analytics directly from the image data in the raw Bayer format 1912, and/or other suitable circuit modules. In various implementations, the circuit/module for receiving image data in a raw Bayer format 1910 and the circuit/module for generating image analytics directly from the image data in the raw Bayer format 1912 may provide and/or incorporate, at least in part, the functionality described above for the CNN of FIG. 5 or the CNN of FIG. 10.

As mentioned above, programming stored by the storage medium 1902, when executed by the processing circuit 1908, causes the processing circuit 1908 to perform one or more of the various functions and/or process operations described herein. For example, the programming may cause the processing circuit 1908 to perform the various functions, steps, and/or processes described herein with respect to FIGS. 5, 6, and/or 10 in various implementations. As shown in FIG. 19, the storage medium 1902 may include one or more of code for receiving image data in a raw Bayer format 1920, and code for generating image analytics directly from the image data in the raw Bayer format 1922 that may be executed or otherwise used to provide the functionality described herein for the circuit/module for receiving image data in a raw Bayer format 1910, a circuit/module for generating image analytics directly from the image data in the raw Bayer format 1912, and/or other suitable circuit modules.

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

For example, in one aspect, a generative model or a CNN configured as Raw2Rec may be configured to train using machine learning.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise, a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A system for training a generative model that is configured to train a convolution neural network (CNN) to directly process sensor image data, the system comprising:
   an image signal processing (ISP) circuitry configure to receive an unlabeled ground truth image in a raw Bayer format and generate an image in a RGB format;
   a generative model configured to receive the image in the RGB format and generate an estimated raw image in the raw Bayer format; and
   an error generation circuitry configured to receive the unlabeled ground truth image in the raw Bayer format and the estimated raw image and to generate an error between the unlabeled ground truth image and the estimated raw image;
   wherein the generative model is configured to train based on a back propagation of the error.

2. The system of claim 1, wherein the generative model comprises at least one of an autoencoder, a variational autoencoder, or a generative adversarial network (GAN).

3. The system of claim 1, wherein the error generation circuitry is configured to perform at least one of a loss function, a cross-entropy loss function, or a mean squared loss function.

4. The system of claim 1, wherein the generative model is configured to train using machine learning.

5. The system of claim 4, wherein the generative model is configured to train based on the back propagation of the error by updating one or more weights of the generative model.

6. The system of claim 1, wherein the generative model comprises a convolutional neural network (CNN) having a U-Net architecture.

7. The system of claim 1:
wherein the generative model comprises a convolutional neural network (CNN) having a modified U-Net architecture comprising an encoder layer and a decoder layer; and
wherein the generative model is configured to generate a scaled input image and pass it to each of the encoder layer and the decoder layer.

8. A method for training a generative model that is configured to train a convolution neural network (CNN) to directly process sensor image data, the method comprising:
receiving an unlabeled ground truth image in a raw Bayer format;
generating an image in a RGB format corresponding to the unlabeled ground truth image;
receiving, at a generative model, the image in the RGB format;
generating, at the generative model, an estimated raw image in the raw Bayer format corresponding to the image in the RGB format;
generating an error between the unlabeled ground truth image and the estimated raw image; and
training, at the generative model, based on a back propagation of the error.

9. The method of claim 8, wherein the training comprises updating one or more weights of the generative model.

10. A system for training a convolution neural network (CNN) to directly process sensor image data, the system comprising:
an error generation circuitry;
a trained generative model configured to receive an image in an RGB format and generate a corresponding image in a raw Bayer format; and
a CNN configured to receive the image in the raw Bayer format and generate an estimated label;
wherein the error generation circuitry is configured to:
receive a known label corresponding a pattern contained in the image in the RGB format;
receive the estimated label from the CNN; and
generate an error between the estimated label and the known label; and
wherein the CNN is configured to train based on a back propagation of the error.

11. The system of claim 10, wherein the image in the RGB format is provided with the known label.

12. The system of claim 10, wherein the image in the raw Bayer format is unlabeled.

13. The system of claim 10, wherein the error generation circuitry is configured to perform at least one of a loss function, a cross-entropy loss function, or a mean squared loss function.

14. The system of claim 10, wherein the generative model was trained using machine learning.

15. The system of claim 10, wherein the CNN is configured to train based on the back propagation of the error by updating one or more weights of the CNN.

16. A method for training a convolution neural network (CNN) to directly process sensor image data, the method comprising:
receiving an image in an RGB format and with a known label;
generating an image in a raw Bayer format corresponding to the image in the RGB format;
generating, at the CNN, an estimated label based on the image in the raw Bayer format;
generating an error between the estimated label and the known label; and
training, at the CNN, based on a back propagation of the error.

17. The method of claim 16, wherein the training comprises updating one or more weights of the CNN.

18. A method for directly processing sensor image data, the method comprising:
training a generative model to convert an RGB image into an estimated image in a raw Bayer format using a ground truth image in the raw Bayer format;
generating, using the trained generative model, a labeled dataset in the raw Bayer format from a labeled RGB image dataset;
training a convolution neural network (CNN) using the labeled Bayer dataset such that the CNN is configured to directly process sensor images in the raw Bayer format; and
generating, using the trained CNN, image analytics directly from image data in the raw Bayer format captured by a sensor.

* * * * *